March 26, 1946.	C. J. MALHIOT	2,397,190
WRAPPING MACHINE
Filed Jan. 9, 1942	13 Sheets-Sheet 3
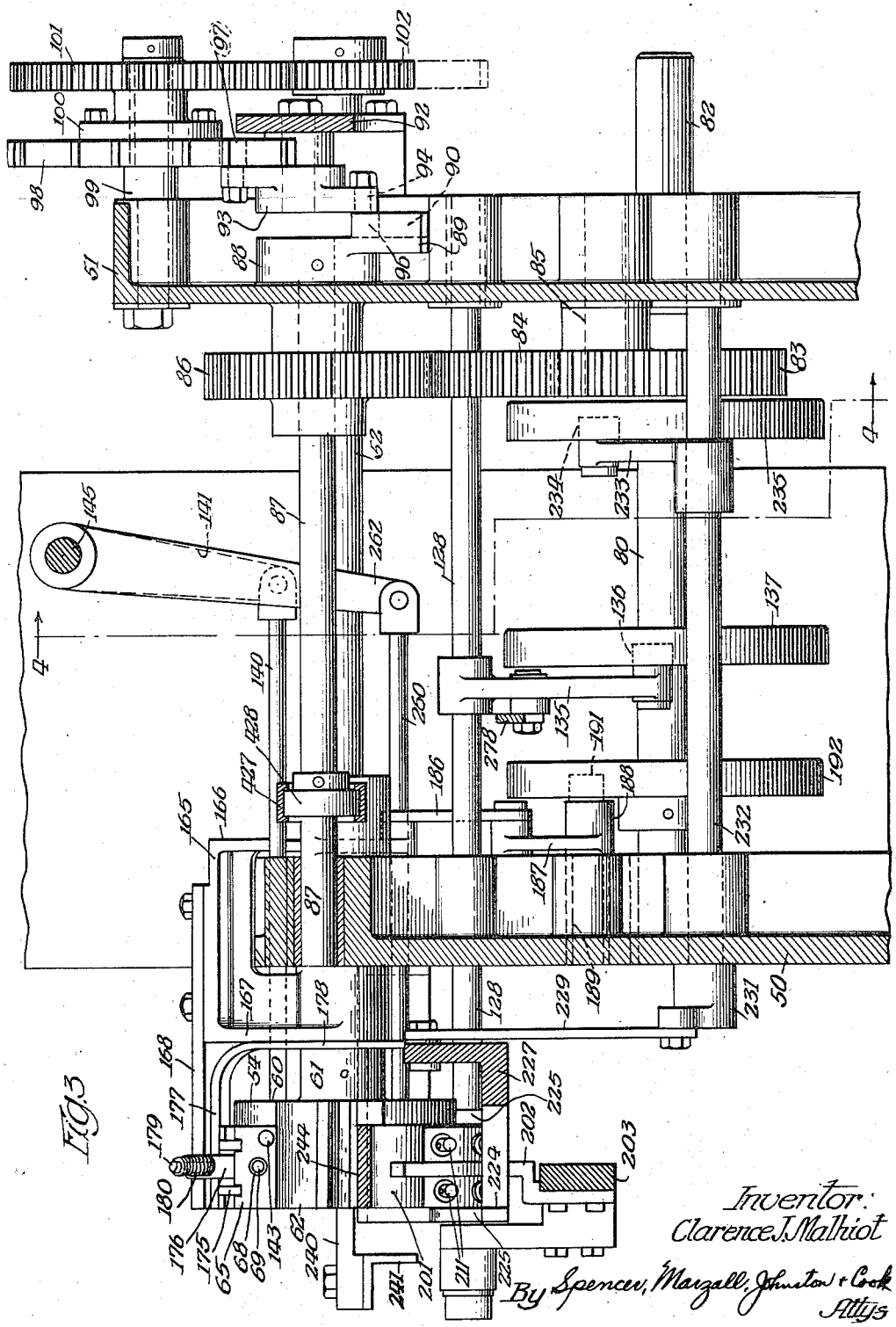
Inventor:
Clarence J. Malhiot
By Spencer, Marzall, Johnston + Cook
Attys March 26, 1946.  C. J. MALHIOT  2,397,190
WRAPPING MACHINE
Filed Jan. 9, 1942  13 Sheets-Sheet 4
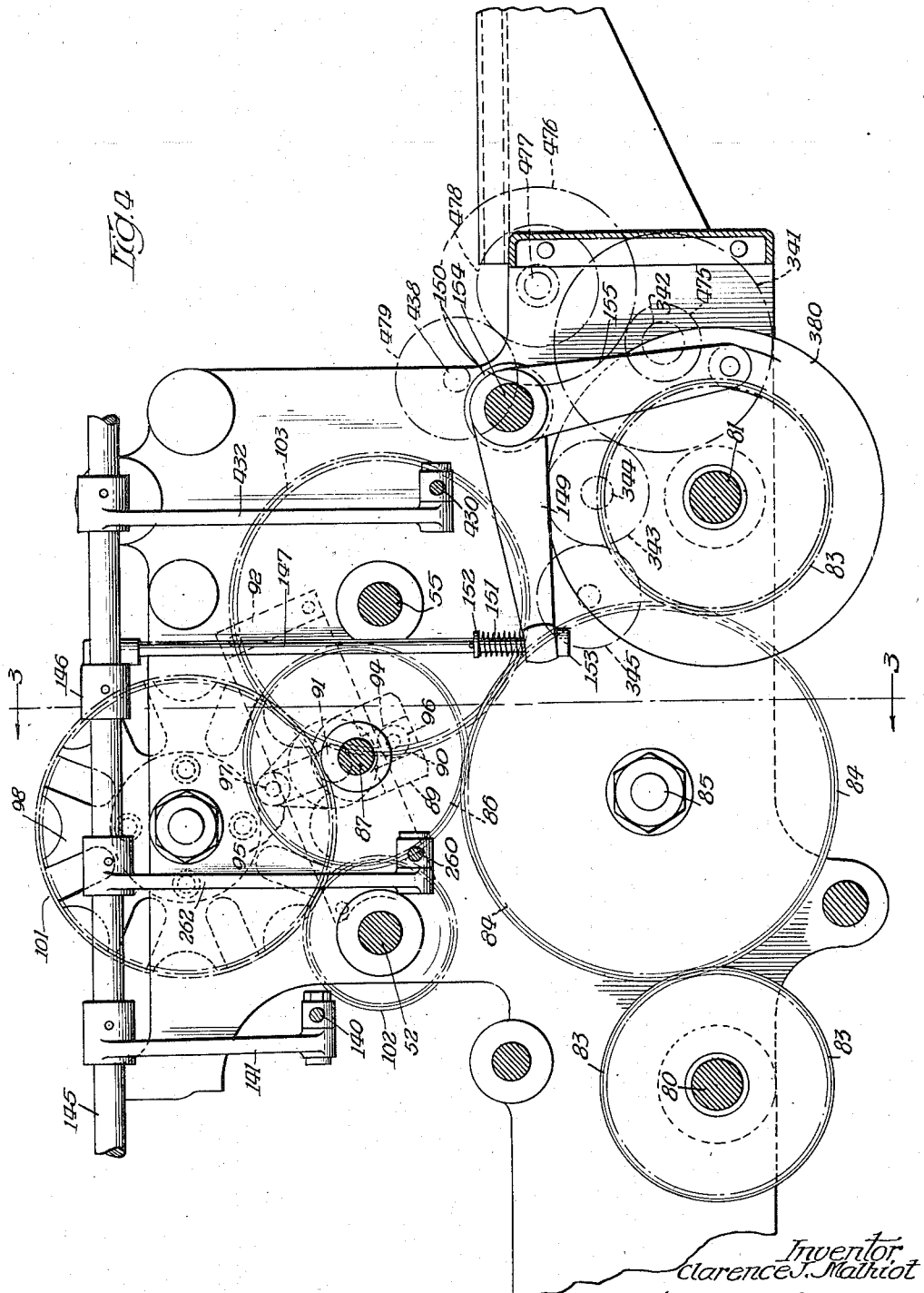
Inventor
Clarence J. Malhiot
By Spencer, Marzall, Johnston & Cook
Attys March 26, 1946.  C. J. MALHIOT  2,397,190
WRAPPING MACHINE
Filed Jan. 9, 1942  13 Sheets-Sheet 5
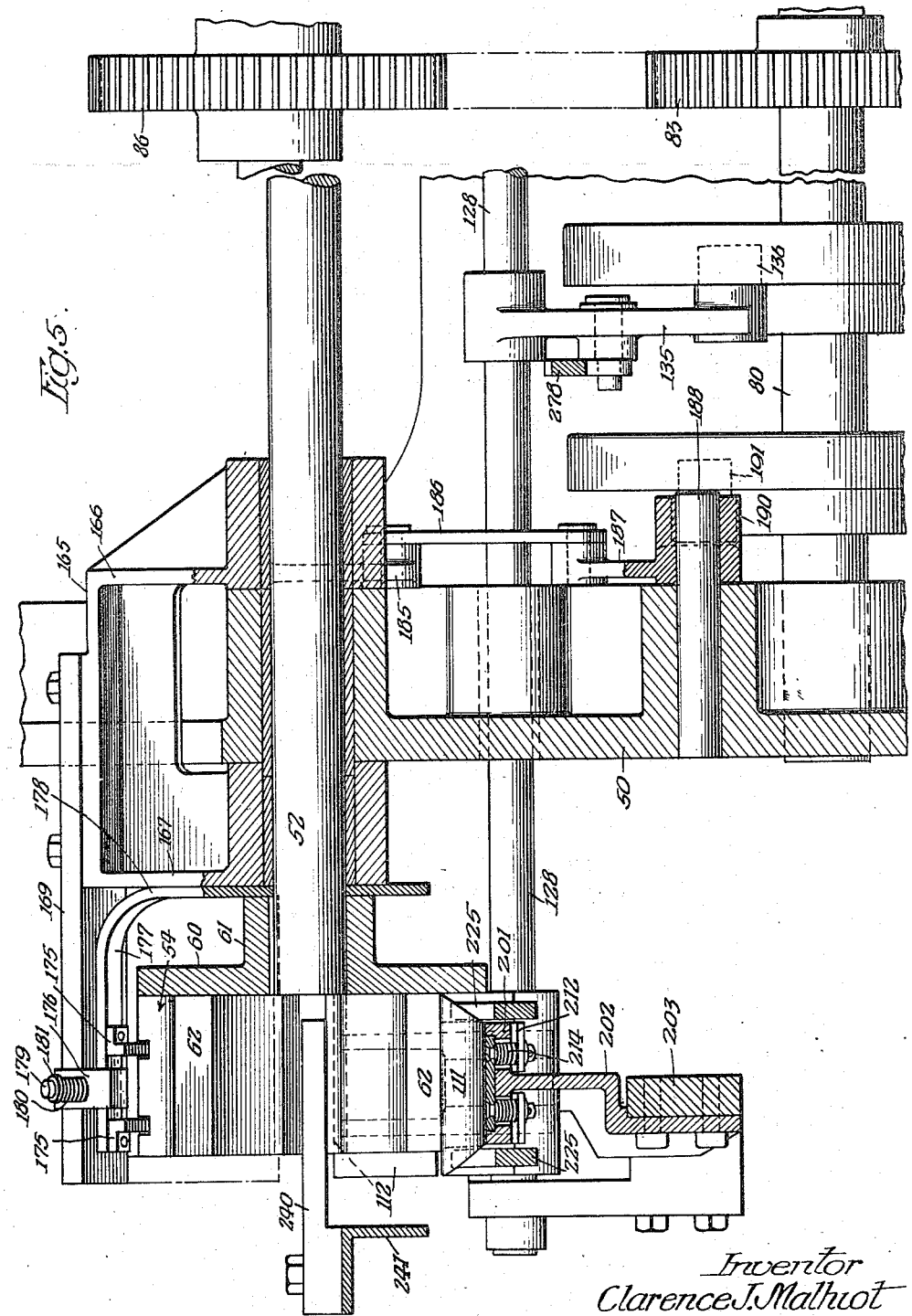
Inventor
Clarence J. Malhiot
By Spencer, Marzall, Johnston & Cook
Attys March 26, 1946. C. J. MALHIOT 2,397,190
WRAPPING MACHINE
Filed Jan. 9, 1942 13 Sheets-Sheet 6
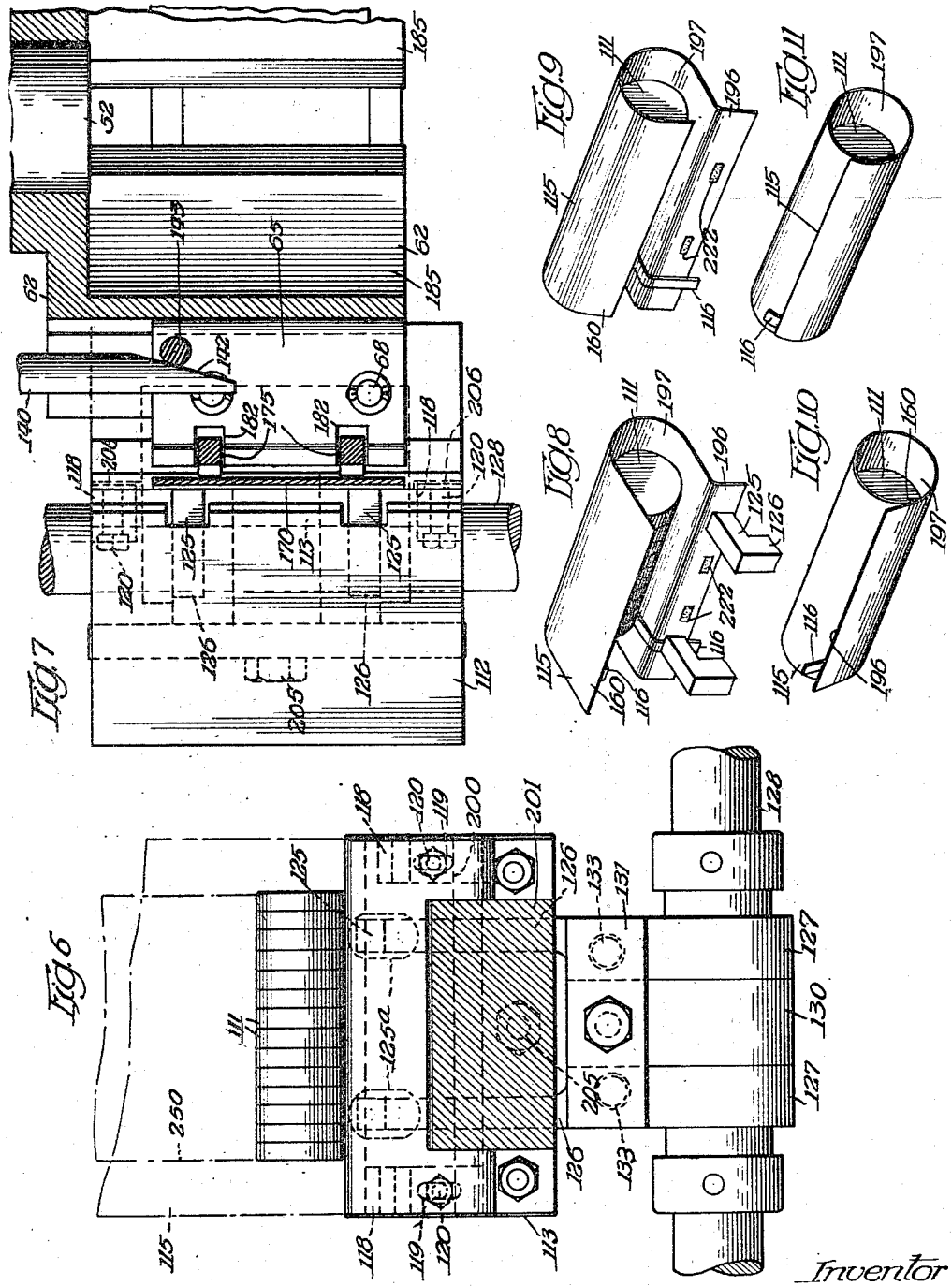
Inventor
Clarence J. Malhiot
Attys

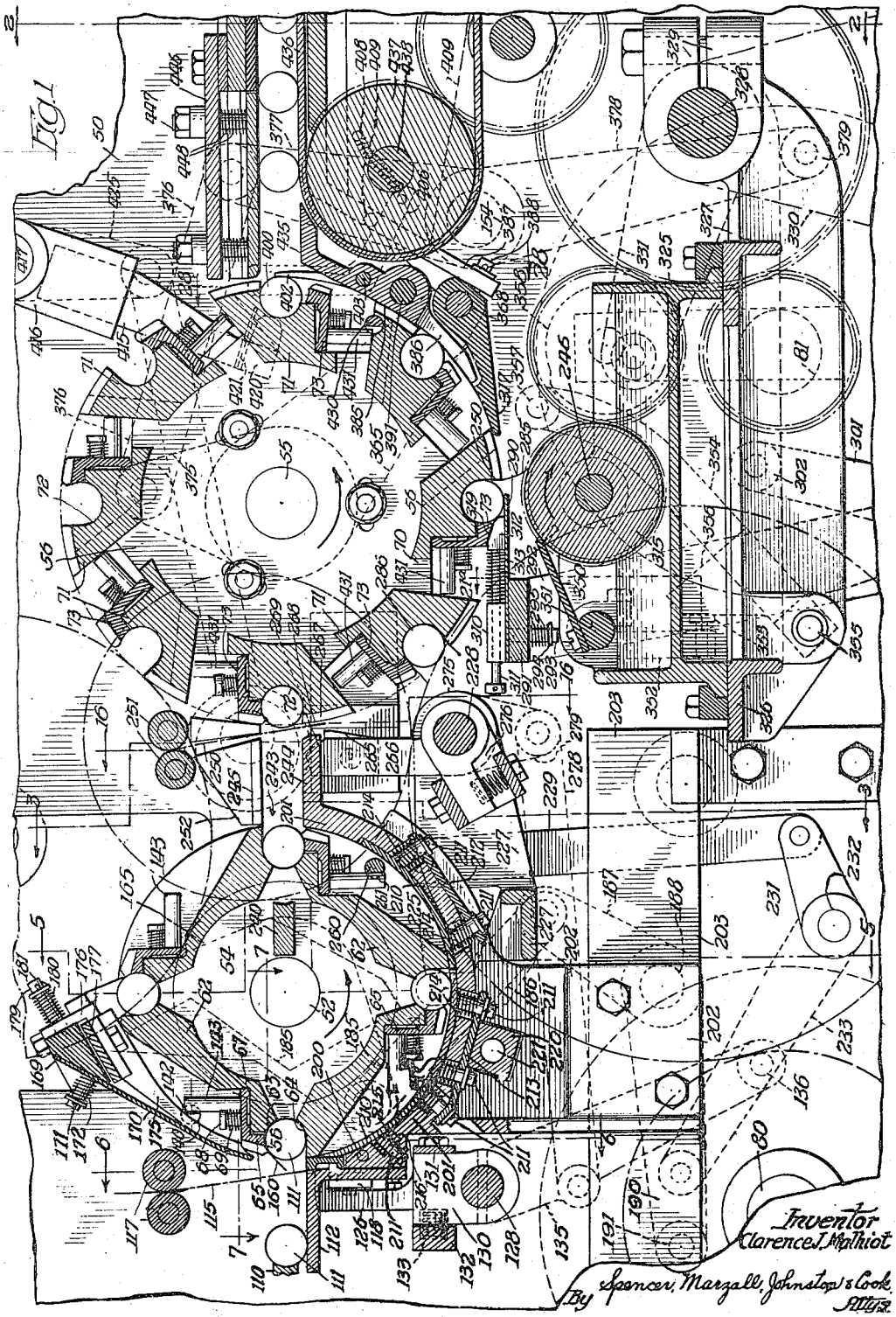

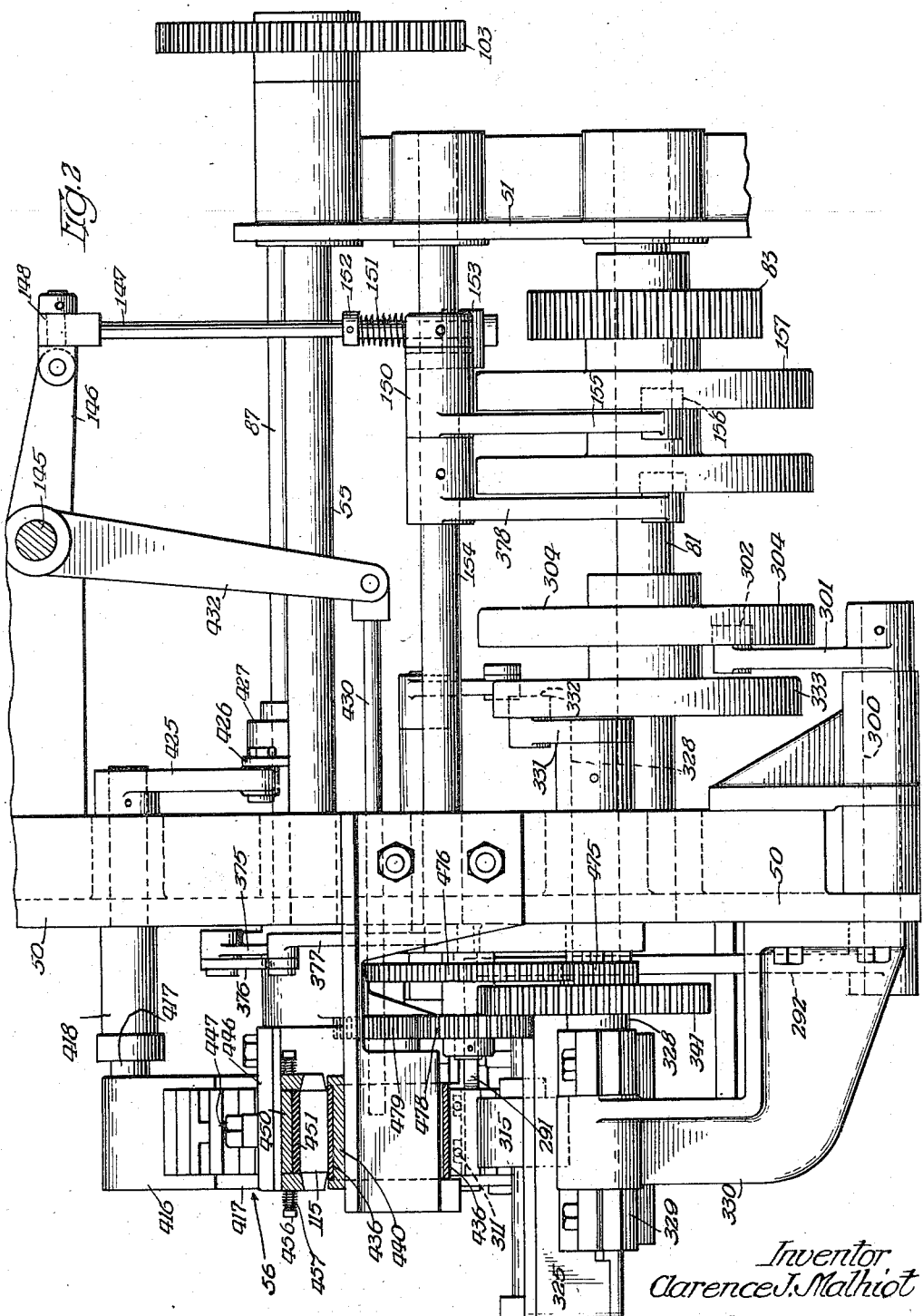

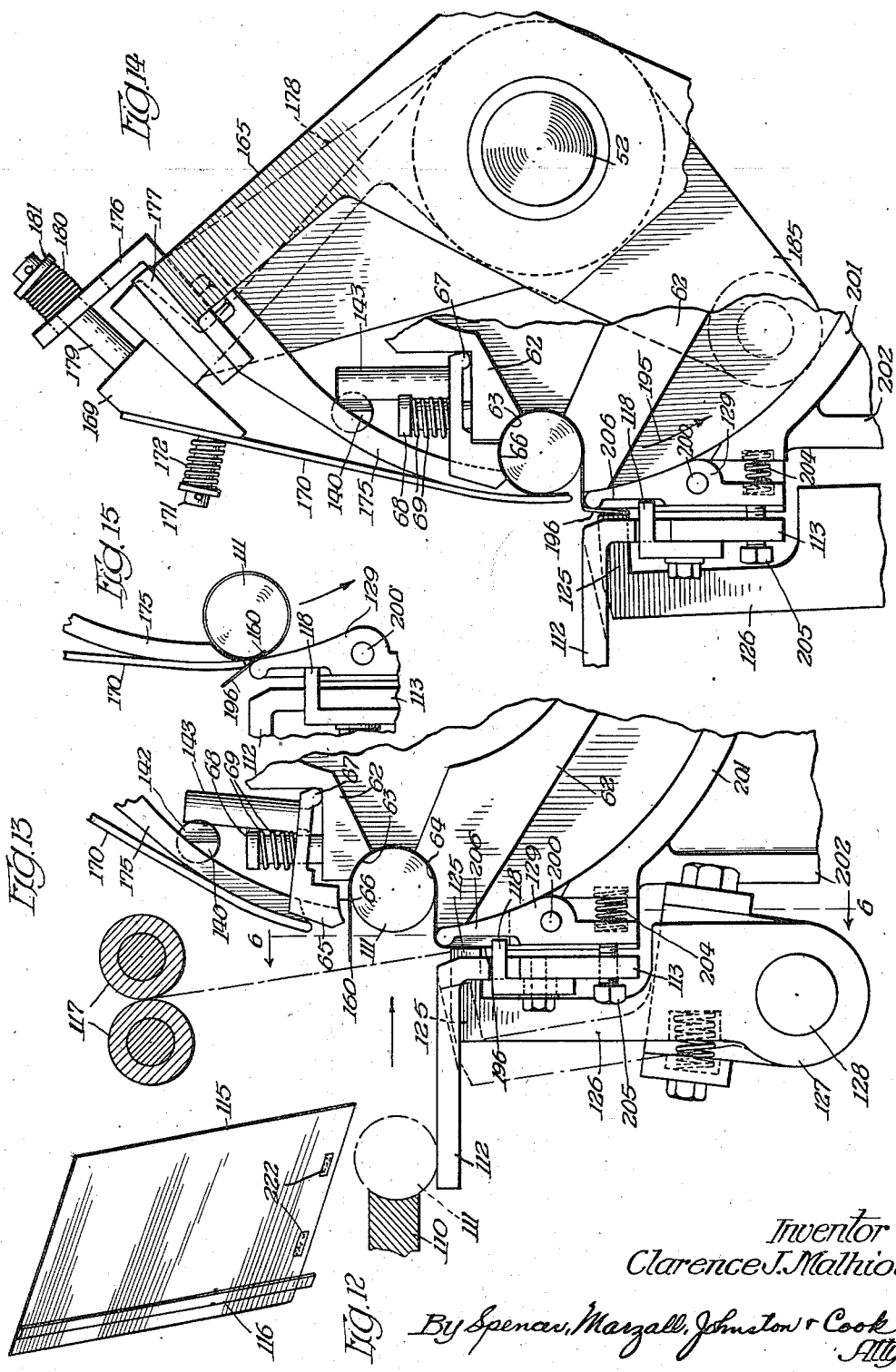

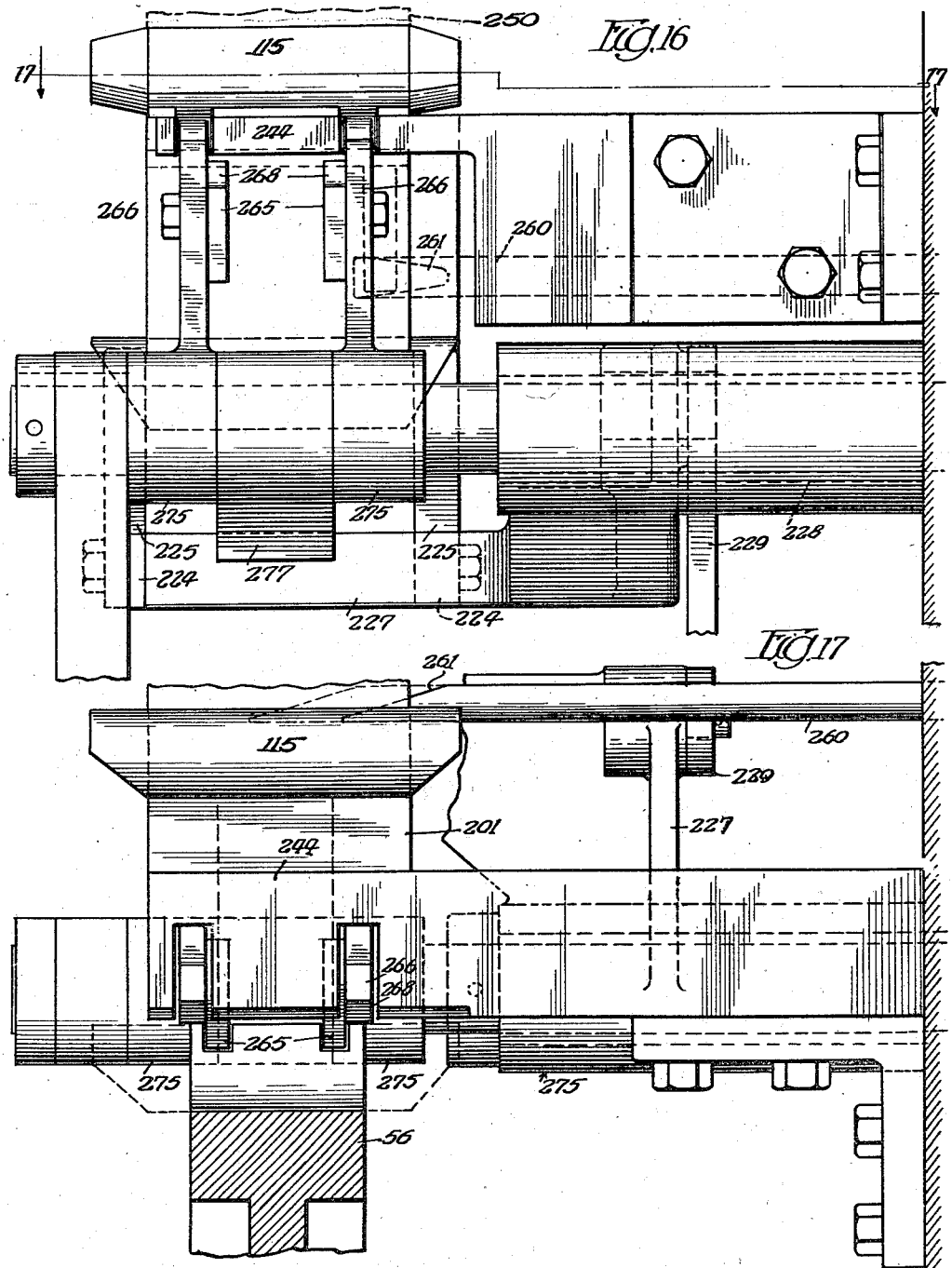

March 26, 1946.  C. J. MALHIOT  2,397,190
WRAPPING MACHINE
Filed Jan. 9, 1942   13 Sheets-Sheet 9
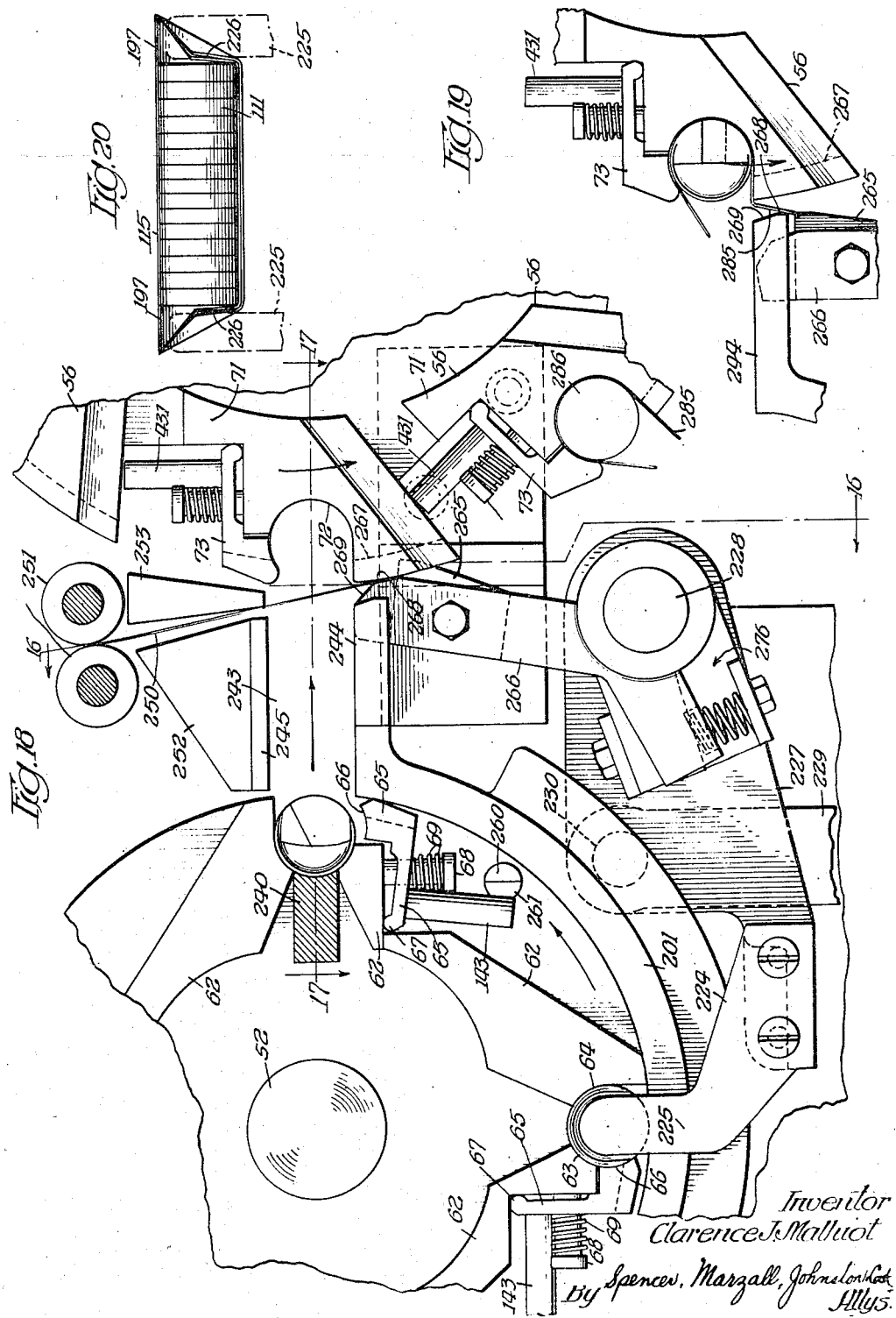
Inventor
Clarence J. Malhiot
By Spencer, Marzall, Johnston & Cook
Attys.

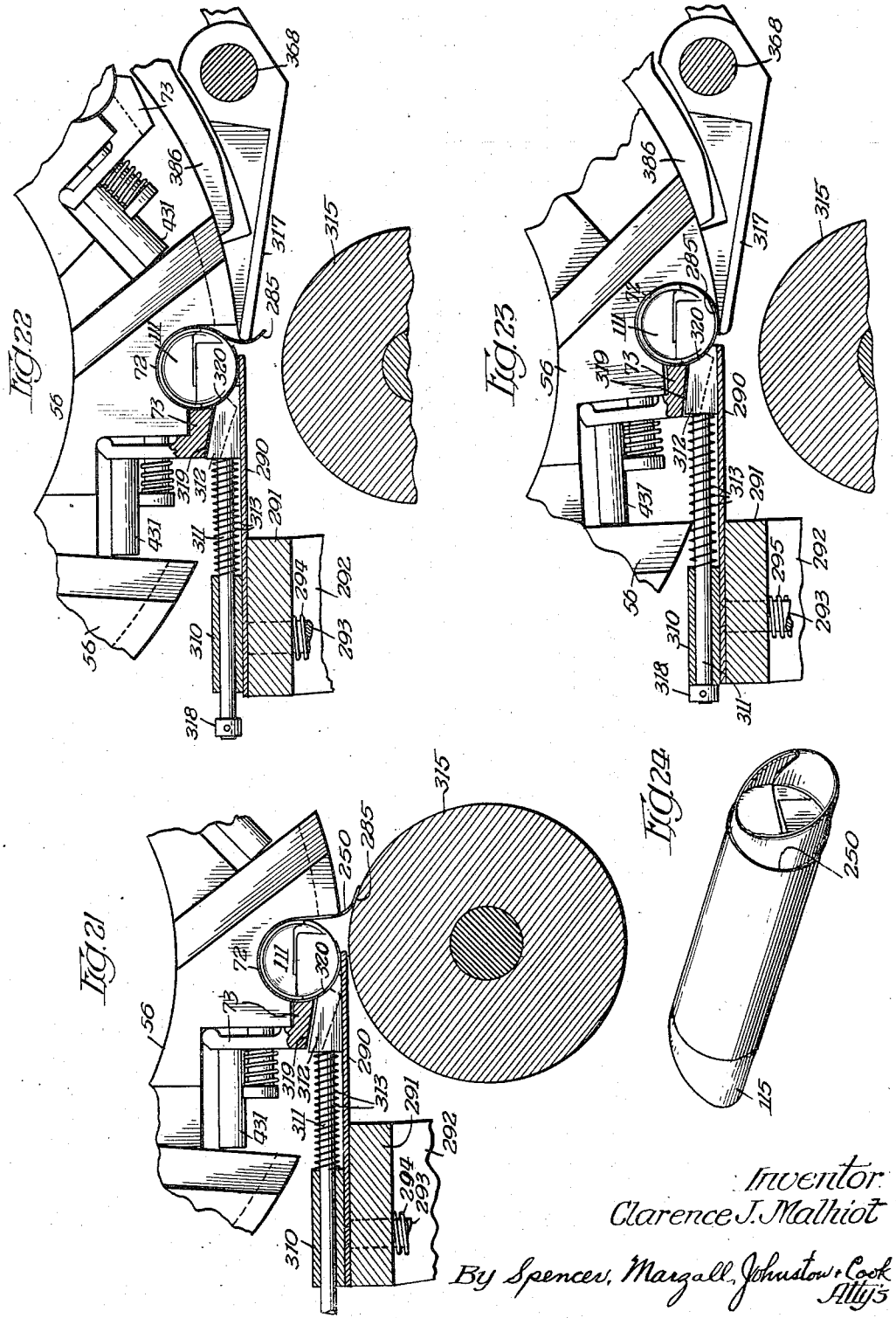

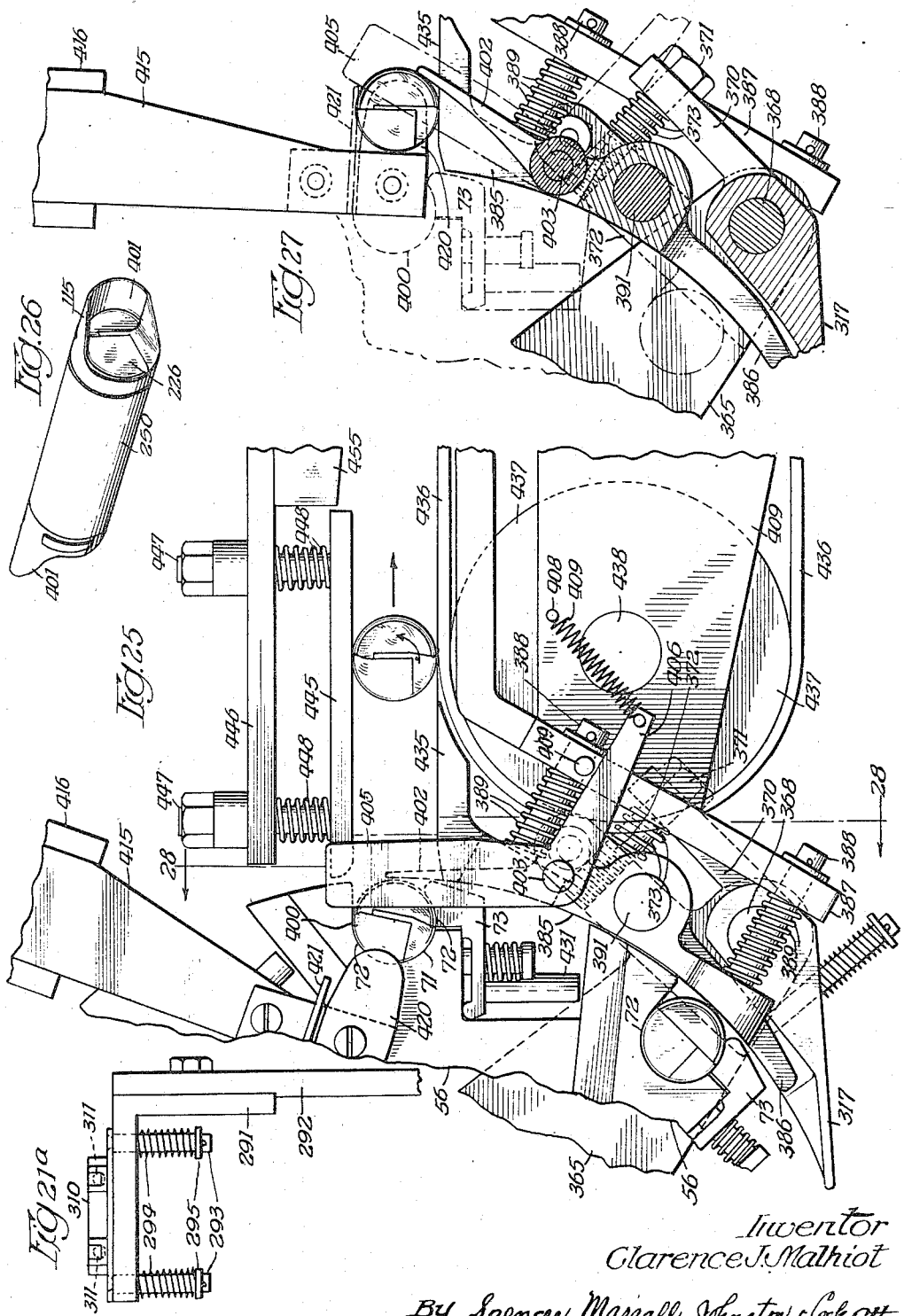

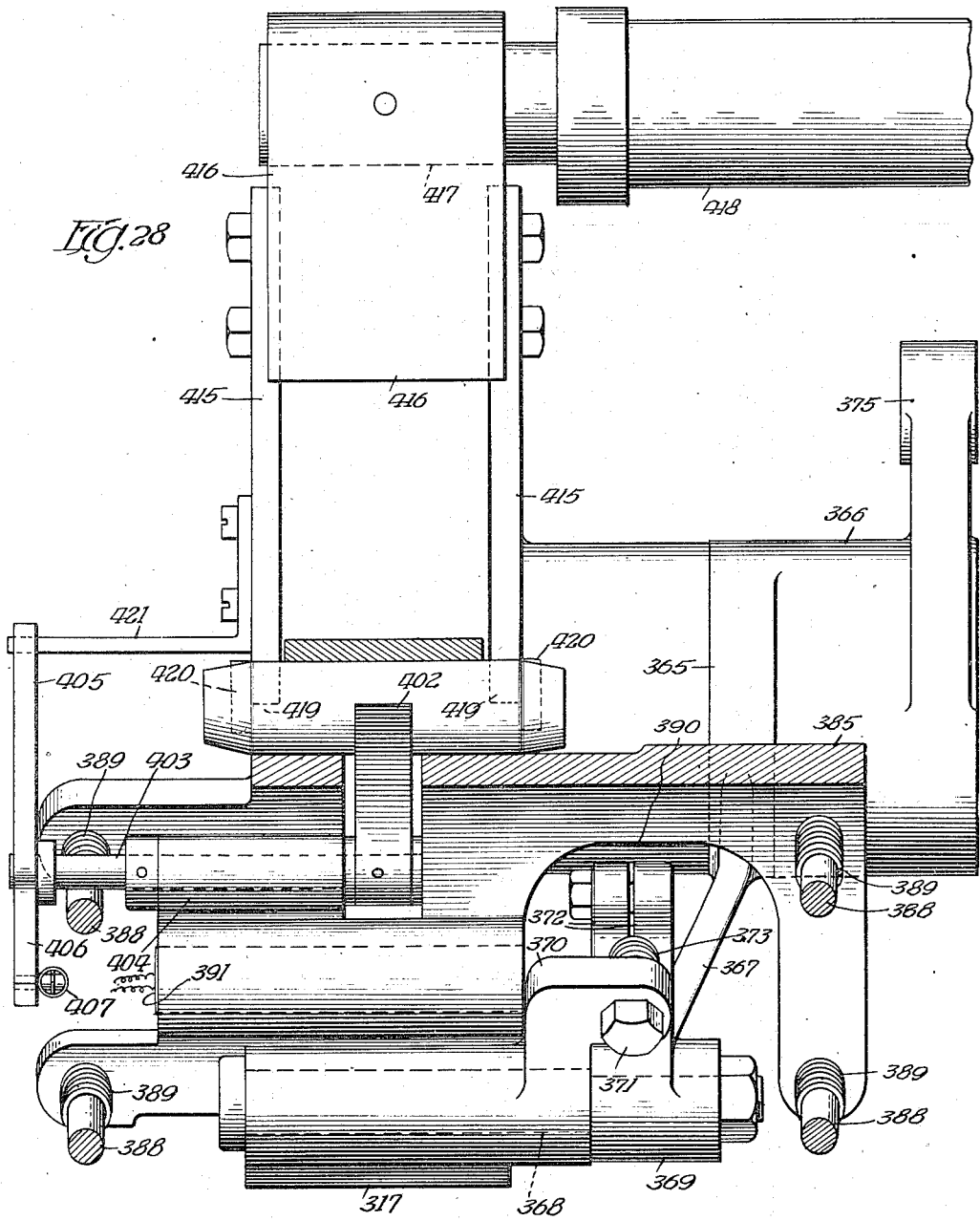

March 26, 1946. C. J. MALHIOT 2,397,190
WRAPPING MACHINE
Filed Jan. 9, 1942 13 Sheets-Sheet 13
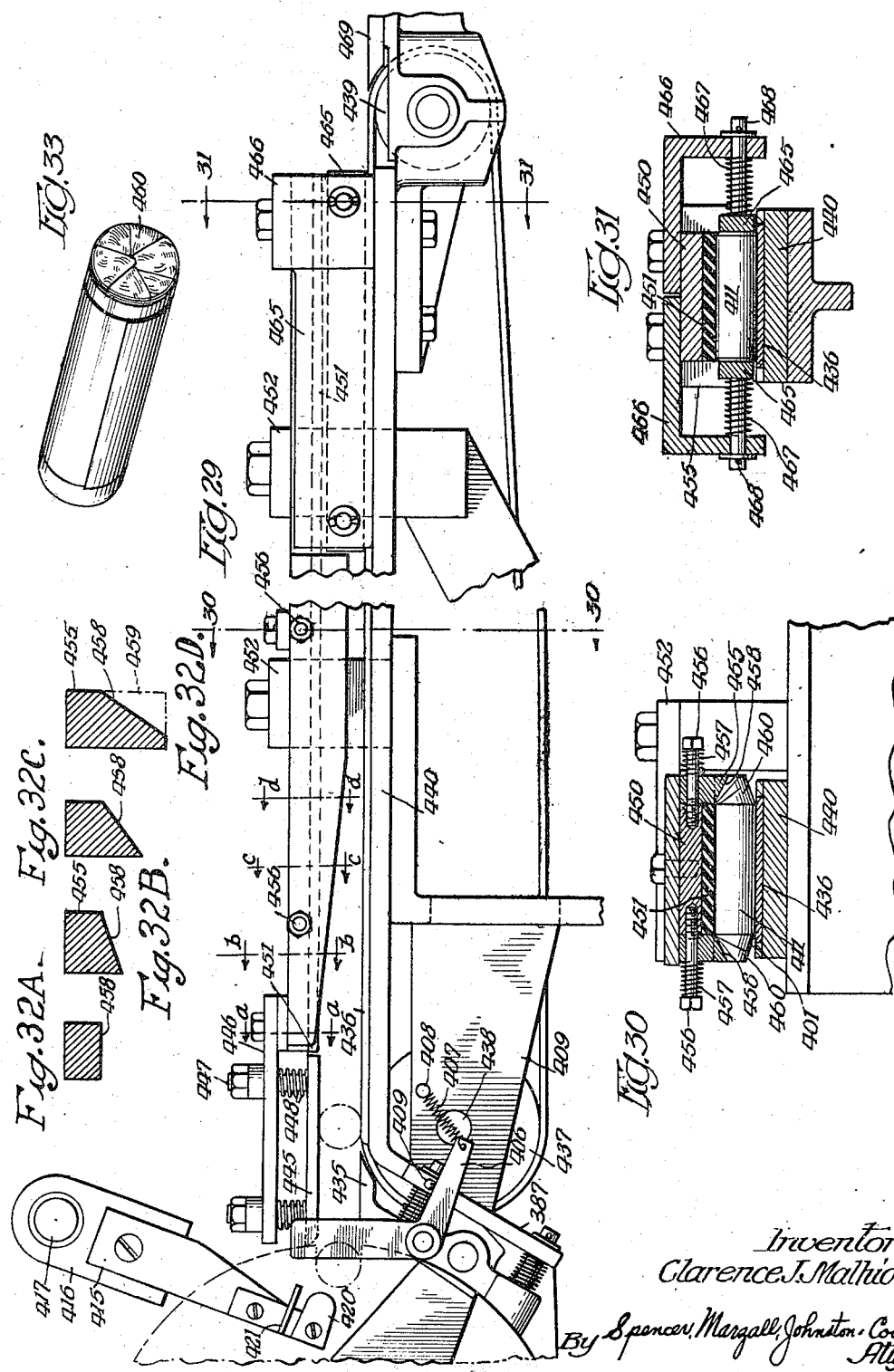

Patented Mar. 26, 1946

2,397,190

UNITED STATES PATENT OFFICE 2,397,190

WRAPPING MACHINE

Clarence J. Malhiot, Oak Park, Ill., assignor to F. B. Redington Co., Chicago, Ill., a corporation of Illinois Application January 9, 1942, Serial No. 426,201

21 Claims. (Cl. 93—2)

This invention relates to a method and apparatus for wrapping articles.

A primary object of the present invention is the provision of an improved method and apparatus for applying a wrapper about an article and then folding the ends of the wrapper against the ends of the article.

A further object is the provision of such wrapping method and apparatus in which an outer band or label is also applied around the exterior of the article.

A further object is to provide for the wrapping of a generally cylindrical article, either solid or tubular, such as a plurality of tablets or wafers arranged in substantially cylindrical form, in a new and improved manner.

A further object is to provide for folding outwardly extending end portions of a wrapper against end portions of an article while rotating the article about a longitudinal axis.

Another object is to provide for folding outwardly extending end portions of a wrapper against end portions of an article by rotating the article about a longitudinal axis while effecting relative movement transversely of said axis between the article and a continuously extending folder member.

A further object is to provide for folding outwardly extending end portions of a wrapper against end portions of an article during movement of the article on a discharge conveyor.

A further object is to provide for folding outwardly extending end portions of a wrapper against end portions of an article during movement of the article on a discharge conveyor, the article being rotated about a longitudinal axis during movement on said conveyor.

A further object is the provision of such wrapping operation in which the folder member comprises a continuous folding surface having a configuration corresponding generally to a portion of a spiral.

A further object is the provision of such wrapping operation in which the folder member comprises a stationary continuous folding surface having a configuration corresponding generally to a portion of a spiral.

A still further object is the provision of a method and apparatus in which end tucks are provided in a wrapper to maintain a plurality of tablets, wafers or the like, in substantially cylindrical form during subsequent wrapping and transfer operations.

A further object is to provide such tucks to maintain the tablets or wafers in substantially cylindrical form during transfer of the article from a wrapping wheel to a band or label applying wheel.

A further object is to provide such tucks to maintain the tablets or wafers in substantially cylindrical form during transfer of the article to a discharge conveyor upon which the end portions of the wrapper are further folded against the ends of the article to completely enclose the article within the wrapper.

A still further object is to provide for wrapping an article by first passing the article into a wrapping wheel in which a wrapper is applied circumferentially thereabout, and thereafter transferring the partially wrapped article to a conveyor and folding end portions of the wrapper against the article by rotation of the article during movement of the article on the conveyor.

A further object is to provide for wrapping articles by first passing the article into a wrapping wheel in which a wrapper is applied circumferentially thereabout, transferring the partially wrapped article to a banding wheel in which an outer band or label is applied to the article, then transferring the article to a conveyor, and folding end portions of the wrapper against the article during movement of the article on the conveyor.

A further object is to provide for wrapping articles by first passing the article into a wrapping wheel in which a wrapper is applied circumferentially thereabout, transferring the partially wrapped article to a banding wheel in which an outer band or label is applied to the article, then transferring the article to a conveyor, rotating the article while on the conveyor, and folding end portions of the wrapper against the article during rotational movement of the article on the conveyor.

A further object is the provision of suitable and improved apparatus and mechanism for effecting the above named wrapping, transfer and folding operations.

A still further object is to provide a completely automatic machine for performing the above operations in a rapid and satisfactory manner.

These and other objects will be apparent from the following description, the appended claims, and the attached drawings which illustrate a selected embodiment of the invention and in which:

Fig. 1 is a vertical section taken along the length of the machine substantially on the line of the wrapping and banding wheels;

Fig. 2 is a right hand end view taken on the line 2—2 of Fig. 1;

Fig. 3 is a transverse sectional view taken on the line 3—3 of Fig. 1;

Fig. 4 is a view, partly diagrammatic, taken on the line 4—4 of Fig. 3;

Fig. 5 is a sectional view taken on the line 5—5 of Fig. 1;

Fig. 6 is a fragmentary sectional view taken on the line 6—6 of Fig. 1;

Fig. 7 is a fragmentary plan view taken on the line 7—7 of Fig. 1;

Fig. 8 is a perspective view showing the first step in the wrapping operation;

Fig. 9 illustrates the article at a further stage of the wrapping operation;

Fig. 10 is a perspective view showing the article at another stage of the wrapping operation;

Fig. 11 shows another view of the article at still a further stage of the wrapping operation;

Fig. 12 is a perspective view of the wrapper as it is advanced towards wrapping position;

Fig. 13 is an enlarged detailed view illustrating the first part of the wrapping operation;

Fig. 14 is a fragmentary detailed view illustrating a further step in the wrapping operation;

Fig. 15 is a fragmentary view illustrating still another step in the wrapping operation;

Fig. 16 is a fragmentary elevational view taken substantially on the line 16—16 of Fig. 1;

Fig. 17 is a fragmentary plan view taken on the line 17—17 of Fig. 16;

Fig. 18 is a fragmentary detailed view showing a part of the wrapping and banding wheels and a portion of the wrapping and banding mechanism;

Fig. 19 illustrates the tucking operation shown in Fig. 18;

Fig. 20 is a fragmentary detail illustrating the next stage of operation of the banding wheel;

Fig. 21 is a fragmentary detail illustrating a portion of the folding and gluing apparatus for the outer wrapper or band;

Fig. 21a is a detailed view of the support for the left hand band folder illustrated in Fig. 21;

Fig. 22 is a fragmentary detailed view illustrating a further step in the application of the outer band;

Fig. 23 is a fragmentary view illustrating a still further step in the application of the outer band;

Fig. 24 is a perspective view of the article as it appears at the position illustrated in Fig. 23;

Fig. 25 is a detailed view of the banding wheel adjacent the band sealing and discharge portion thereof;

Fig. 26 is a view of the wrapped article as it is discharged from the wrapping and banding mechanism;

Fig. 27 is a detailed view of a portion of the apparatus shown in Fig. 25 with the parts in a different operating position;

Fig. 28 is a fragmentary detailed view taken on the line 28—28 of Figs. 1 and 25;

Fig. 29 is a detailed view of the discharge conveyor and end folding device;

Fig. 30 is a sectional view taken on the line 30—30 of Fig. 29;

Fig. 31 is a sectional view taken on the line 31—31 of Fig. 29;

Figs. 32a, 32b, 32c and 32d are a plurality of somewhat enlarged sectional views through the end folding device of Fig. 29 taken along the lines a—a, b—b, c—c, and d—d, respectively, of Fig. 29; and Fig. 33 is a perspective view of the wrapped package with the end portions folded down in accordance with the present invention.

Referring to the drawings and more particularly to Figs. 1, 2 and 3, there is shown a vertical main frame 50 which extends along the length of the machine and is supported upon a suitable base (not shown). A second frame 51 extends upwardly from the base at the rear end of the machine and together with the main frame 50 provides a support for the operative parts of the machine. A shaft 52 is journaled in the frame members 50 and 51 and at its forward end carries a wrapping wheel 54. A second shaft 55 is journaled in the frame members and at its forward end carries a banding wheel 56.

The wrapping and banding wheels

The wrapping wheel 54 comprises a rear plate 60, Figs. 3 and 5, provided with a hub 61 which is keyed to the shaft 52. A plurality of lugs or projections 62 are integrally connected with the plate 60 and extend forwardly therefrom. The projections 62 are provided with arcuate portions 63 and 64 which extend axially of the shaft 52 and provide a recess or pocket for receiving a cylindrical or tubular article. Each of the lugs 62 is provided with an article clamping finger 65 having an arcuate portion 66 extending forwardly of the arcuate portion 63 and adapted to engage around and clamp an article in the pocket of the wrapping wheel.

The article clamping finger 65 comprises a generally L-shaped member having a rounded portion 67 at one end which seats within an angle provided in the lug 62 and provides a pivot for the finger 65. A headed pin 68 is mounted upon the angle portion of the lug 62 and extends through an opening provided in the clamping finger 65. A coiled spring 69 is compressed between the head of the pin 68 and the finger 65 and normally tends to urge the finger into clamping engagement with an article as illustrated in Fig. 14. The pin 68 and spring 69 also serve to maintain the clamping finger 65 in proper position on the lug 62.

The banding wheel 56 comprises an inner hub or plate member 70 and a plurality of radially extending lugs 71 integrally connected therewith. Each of the lugs 71 is provided with an outwardly opening recess or pocket 72 adapted to receive a partially wrapped article. The lugs 71 are shortened at one side of the recess 72 and a spring pressed article clamping finger 73, generally similar to the clamping finger 65, is mounted thereon.

The lugs or outwardly projecting member 62 of the wrapping wheel 54 provide four article receiving pockets arranged 90° apart. The lugs 71 of the banding wheel provide eight article receiving pockets 72 equally spaced around the periphery of the wheel. Both the wrapping wheel and the banding wheel are intermittently operated in coordinated timed relationship through the several stations indicated in Fig. 1 of the drawings.

The drive mechanism

The entire machine is operated by two drive shafts 80 and 81 which extend transversely of the apparatus at the left and right sides respectively. One of the shafts, the left in the illustrated embodiment, comprises the main drive shaft, and as shown in Fig. 3, is provided with a rearwardly extending end 82 adapted to be connected to any desired source of power (not shown) such as an electric motor.

Each of the shafts 80 and 81 are provided with a gear 83 which meshes with a large idler gear 84, Figs. 3, 4, and 5, mounted on a stub shaft 85 carried by the frame member 51. The gear 84 also meshes with a gear 86 attached to a shaft 87 which extends transversely of the machine and is journaled in the frame members 50 and 51. A plate or hub 88 is attached to the shaft 87 on the rear side of frame 51 and has a radially extending arm 89 provided with a radially extending slot 90. A stub shaft 91 is journaled in a bracket 92 attached to the frame 51 and rotatably supports a hub 93 having radially extending arms 94 and 95. The arm 94 carries a roller 96 which is received within the slot 90 of the arm 89. The arm 95 carries a roller 97 which serves to operate a conventional Geneva wheel 98. The stub shaft 91 is located slightly out of alinement with the shaft 87, as shown in Figs. 3 and 4, and the drive members 88 and 93 provide for driving the Geneva wheel in a more swooth and uniform manner.

The Geneva wheel 98 is mounted upon a stub shaft 99 carried by the frame member 51. A plate 100 is fastened to the Geneva wheel for rotation therewith and carries a gear 101 which is also journaled for rotation on the shaft 99. The gear 101 meshes with a gear 102 fixed to the wrapping wheel shaft 52 and also meshes with a larger gear 103 fixed to the shaft 55 of the banding wheel 56. The wrapping wheel 54 and the banding wheel 56 are thus intermittently rotated in timed relationship in accordance with movement of the Geneva wheel.

*Wrapper and article feed mechanism*

The article, which is of generally cylindrical shape, either solid or tubular, is fed to the wrapping wheel, and the first operation is the folding of a wrapper circumferentially thereabout. In the illustrated embodiment of the invention the substantially cylindrical article comprises a plurality of tablets or wafers which are arranged in axial alinement. Any suitable means, not forming a part of the present invention and not shown, may be provided for arranging the tablets in substantially cylindrical form. Any suitable means, indicated only generally by the reference character 110 in Figs. 1 and 13, is also provided for pushing the article into the wrapping wheel and for maintaining the tablets in proper cylindrical form during the feed thereof.

Referring to Figs. 1 and 13, the cylindrical article 111 is fed along the upper surface of a table 112 comprising an angle member having a downwardly extending portion 113. The pusher 110 advances an article in proper timed relationship with the dwell of an article receiving pocket adjacent the table 112. In Figs. 1 and 13, one article 111 is shown within a pocket of the wrapping wheel at the feeding station and a second article 111 is shown on the table 112 ready to be pushed forward by the pusher 110 upon the next dwell period of the wrapping wheel.

Prior to the feed of the article by pusher 110, however, a sheet of wrapping material 115, Fig. 12, which may comprise foil or the like, preferably having a tearing tab 116 arranged on one surface thereof, is first fed downwardly by any suitable feed mechanism indicated generally by the feed rolls 117. The lower end of the wrapper as fed by the rolls 117 rests upon a pair of angle bars 118 which are bolted to the downwardly extending leg 113 of the angular feed table and extend through slots provided in the leg 113 (see Figs. 6 and 13). As shown in Fig. 6 the wrapper supporting angle bars 118 are provided with elongated adjusting slots 119 and the bolts 120, which clamp the angle bars to the member 113, extend through these slots.

*Wrapper gripping mechanism*

Also prior to the feed of the article into the pocket of the wrapping wheel the lower end of the wrapper 115 is gripped by a pair of fingers 125 which are carried by upwardly extending arms 126 and extend through suitable slots 125a provided in the downwardly extending leg 113 of the feed table 112. The arms 126 are provided with hub portions 127 which are loosely mounted on a shaft 128 and are adapted to be rocked from the dotted line position of Fig. 13 to the full line position of this figure. During the feed of the wrapper 115 by the feed rolls 117 the arms 126 and fingers 125 occupy the dotted line position to permit feeding of the wrapper downwardly into engagement with the angle members 118. As soon as the feed of the wrapper has been completed the arms and fingers are rocked to the full line position in which they clamp the lower end of the wrapper against a lower folder 129.

The fingers 125 and arms 126 are rocked between the operative and inoperative positions by means of an arm 130 which is attached to the shaft 128 between the hubs 127. The arm 130 carries a pair of plates 131 and 132 which extend transversely of the arm and overlie the arms 126 on opposite sides thereof. Coil springs 133 are mounted in cooperating recesses or pockets provided in the plate 132 and each of the arms 126 and normally urge the arms into engagement with the stop plate 131. Upon rocking of the shaft 128 to move the fingers 125 into clamping position the shaft moves through an angle slightly greater than that necessary to bring the fingers 125 against the folder 129, and the wrapper is gripped by the action of the springs 133.

The shaft 128 is rocked to operate the wrapper clamping fingers 125 by means of a lever 135, Figs. 1 and 3, which is rigidly attached to the shaft. The lower end of the lever 135 carries a roller 136 which operates within a groove provided in one face of a cam 137. The cam 137 is attached to the drive shaft 80 and rotates therewith. Thus, as the cam rotates, the clamping fingers 125 are alternately moved between operative and inoperative positions in coordinated timed relation to the other parts of the machine.

*Article clamping mechanism*

After the wrapper 115 has been fed by the feed rolls 117 and clamped at its lower end by the fingers 125, the pusher 110 operates to move the article through the wrapper and into one of the pockets of the wrapping wheel. Just prior to this, however, a mechanism operates to move the article clamping finger 65 to a raised inoperative position as illustrated in Fig. 13. As soon as the article has been moved into the pocket of the wrapping wheel this mechanism again operates to release the finger 65 and permit it to move into clamping engagement with the article under action of the spring 69. At this stage of the operation the package, with the wrapper 115 partially wrapped around the article 111, appears as illustrated in Fig. 8.

The mechanism for operating the article clamping finger 65 to move the finger to a non-clamping position comprises a rod 140 which extends transversely of the machine, Fig. 3, adjacent the feeding station and is moved axially by means of a lever 141, Figs. 3 and 4. The rod 140 is slidably mounted in the main frame 50 through which it extends and is provided on its forward end with a tapered cam surface 142, Fig. 7. An upstanding pin 143 is attached to each of the clamping fingers 65 and extends upwardly into the path of movement of the rod 140 when the finger is at the feeding station of the wrapping wheel. Thus, when the rod 140 is moved forwardly by the lever 141, the inclined cam surface 142 engages the pin 143 and rocks the finger 65 to the inoperative position as illustrated in Fig. 13. When the rod 140 is moved rearwardly by lever 141 the pin 143 is released and permits the finger 65 to be moved into clamping position under action of the spring 69.

The lever 141 is attached to a rock shaft 145, Figs. 2, 3 and 4, which extends longitudinally of the machine and is rocked by means of an arm 146 rigidly attached to the shaft and extending rearwardly of the machine, Fig. 2. A vertically extending link 147 has its upper end connected to the arm 146 by means of a universal coupling 148 and has its lower end slidably received within an opening provided in an arm 149 of a bell crank 150, Fig. 4. A spring 151 surrounds the link 147 above the arm 149 and operates through a pair of collars 152 and 153 on the link to provide a resilient driving connection between the link and the arm 149. The bell crank 150 is rotatably mounted upon a transverse shaft 154 and is provided with a downwardly extending arm 155 which carries a roller 156. The roller 156 operates within a cam groove provided in one face of a cam 157 attached to the right hand drive shaft 81, Fig. 2. Thus, as the shaft 81 rotates the rod 140 operates in proper timed relationship through the cam 157, bell crank 150, link 147, arm 146, and rock shaft 145.

*Upper wrapper side folding operation*

After an article has been fed to the wrapping wheel and clamped therein by the finger 65, the upper end 160 of the wrapper which now extends outwardly, as illustrated in Figs. 8 and 13, is folded down against the side of the article. This operation takes place during the dwell of the wrapping wheel and article at the feeding station. Referring to Figs. 1 and 3, an arm 165 in the form of a yoke having downwardly extending legs 166 and 167, is pivotally mounted on the axis of the wrapping wheel 54. The legs 166 and 167 straddle the main frame 50 and are journaled upon the outer surface of a bushing which is carried by the frame and also serves as a bearing for the shaft 52 of the wrapping wheel. The arm 165 carries a forwardly extending plate 168 having an inclined surface 169. The inclined surface 169 carries a relatively thin, downwardly projecting, wrapper side folder 170 which is resiliently mounted on the block by means of a pin 171 and spring 172.

The wrapper side folder 170 normally extends downwardly to the position illustrated in Figs. 1 and 13 of the drawings. In this position the folder terminates just a short distance above an article receiving pocket of the wrapping wheel when the pocket is at the feed station. As soon as the article has been inserted in a pocket and clamped, however, the arm 165 is rocked on its pivot to move the folder 170 downwardly as illustrated in Fig. 14. During this movement the lower curved end of the folder engages the portion 160 of the wrapper and folds it downwardly against the side of the article.

The wrapper side folding mechanism also carries a stripper means to provide for holding the folded portion 160 of the wrapper against the side of the article during relative movement between the folder and article after the above described folding operation. Referring to Figs. 1, 3, 13, and 14, the stripper comprises a pair of bars or fingers 175 which extend downwardly inside of the folder 170. The fingers 175 are rigidly connected at their upper ends to an angle member 176 which is carried by an arm 177 overlying the wrapping wheel beneath the plate 168 of the folding mechanism. The arm 177 forms an integral extension of a member 178 pivotally mounted on the shaft 52 of the wrapping wheel 54. A pin 179 is mounted on the plate 168 and extends through an enlarged opening in the upwardly extending portion of the angle member 176. A spring 180 compressed between the angle member 176 and a washer 181 on the pin 179 provides a resilient driving connection between the angle 176 and the plate 168.

The spring 180 thus normally maintains the angle 176 against the upper surface of plate 168 as illustrated in Fig. 1 and provides for normally moving the stripper fingers 175 in accordance with the movement of the folder 170. Upon engagement of the stripper fingers with the article, however, as illustrated in Fig. 14, the stripper fingers can remain stationary while the folder 170 continues to move downwardly by compressing the spring 180, as also illustrated in this figure. When the wrapping wheel containing the article starts to rotate, however, the strippers 175 will follow the movement of the article due to the action of spring 180 and prevent the portion 160 of the wrapper from becoming loose by relative movement between the article and folder 170. This action of the strippers continues as the folder 170 is retracted to its inoperative position until the ends of the strippers extend to approximately the lower end of the folder as illustrated in Fig. 13.

The lower ends of the strippers 175 are provided with an arcuate curvature adapted to engage around the article and the partially folded wrapper thereon and to form a continuation of the arcuate surface 66 on the article clamping fingers 65. The clamping fingers 65 are also provided with suitable notches 182, Fig. 7, through which the strippers 175 operate.

Operation of the arm 165 and folder 170 is effected by an arm 185 which is formed integrally with the rearward leg 166 of the yoke arm 165. A link 186 is pivotally connected to the arm 185 and is pivotally connected at its other end to an arm 187 of a bell crank 188 which is pivotally mounted on a shaft 189 carried by the main frame 50, Fig. 3. The bell crank 188 has a second arm 190 which carries a roller 191. The roller 191 operates within a cam groove provided in a face of a cam 192 attached to the main drive shaft 80.

*Lower wrapper side folding operation*

When the folder 170 reaches the position shown in Fig. 14, the Geneva wheel starts to rotate the wrapping wheel in the direction of the arrow 195. During this portion of the operating cycle, the folder 170 also continues to move downwardly with the article until it reaches the position illustrated in Fig. 15. Downward movement of the folder 170 then terminates and the lower folder 129 comes into operation to fold the lower portion 196 of the wrapper against the side of the article in overlapping relationship with respect to the wrapper portion 160. After this the folder 170 and the strippers 175 are retracted into the inoperative position by the arm 168.

Just prior to movement of the wrapping wheel, the wrapper clamping fingers 125 are moved to their inoperative position to release the lower end of the wrapper. The package then has the form illustrated in Fig. 9. As the wrapping wheel continues to rotate to move the article to the lower station, the folder 129 engages against the wrapper portion 196 and folds it against the article as above described. The timing of the parts is such that the retracting movement of the folder 170 and strippers 175 does not start until the folder 129 has caused the wrapper portion 196 to partially overlap the upper wrapper portion 160, as illustrated in Figs. 10 and 15. Fig. 11 illustrates the package after the folder 129 has completed its operation. The wrapper 115 has a width substantially greater than the length of the article 111, as shown in Figs. 8 to 11, to provide portions 197 which extend outwardly from each end of the article and are adapted to be folded down as hereinafter described to enclose the ends of the article.

The folder 129 is pivotally mounted at 200 to a saddle block 201, Figs. 1, 3, 13, and 14, which extends around the entire lower portion of the wrapping wheel 54. The saddle 201 is carried by a bracket 202 which is attached to a bracket 203, Fig. 3, mounted on the machine frame. A spring 204 is mounted within cooperating recesses or pockets provided in the folder 129 and saddle 201 and provides for resiliently urging the folder into engagement with the wrapper and article during the folding of the lower portion 196 of the wrapper. A set screw 205 is threadedly mounted in the downwardly extending portion 113 of the feed table and provides a stop for limiting movement of the folder 129 under action of the spring 204. The folder 129 is also provided with slots 206, Figs. 7, 13 and 14, for receiving the forward ends of the wrapper stops 118.

*Wrapper side sealing and end tucking apparatus*

The saddle block 201 carries a plurality of pairs of pressure plates 210 which are resiliently urged into pressing engagement with the folded wrapper sides during transit of the article from the feeding and folding position of Figs. 13, 14 and 15 to a discharge position diametrically opposite thereto. Each of the pressure plates 210 carries a pair of radially extending pins 211. A plurality of plates 212 and 213 are bolted to the outside of the saddle block 201, and spring members 214 compressed between the pressure plates 210 and the plates 212 and 213, together with a spring member 215 mounted within a recess 216 provided in the saddle block 201 adjacent the folder 129, provide for urging the pressure plates 210 against the folded side portions of the article.

The plates 213 carry a supporting member 220 within which is mounted a cartridge type of electrical heating element 221. As illustrated in Figs. 8, 9 and 12, a plurality of spots 222 of wax are stenciled upon the wrapper 115 in position to engage the upper portion 160 of the wrapper when the lower portion 196 is folded thereover. During movement of the article with the partially folded wrapper thereon past the pressure plates 210 having the heater 221 attached adjacent thereto, the waxed portions 222 are melted sufficiently to provide a seal between the wrapper portions 160 and 196 during continued movement of the article and wrapper around the pressure plates 210.

When the wrapping wheel 54 together with partially wrapped article therein reaches the lowermost position illustrated in the drawings, at which point it dwells while a new article is inserted in the wheel, a pair of tucking fingers 225 move upwardly adjacent the ends of the article 111 to provide a tuck 226 in each outwardly extending portion 197 of the wrapper 115, as illustrated in Fig. 19 of the drawings. This tucking operation folds a portion of the outwardly extending ends 197 of the wrapper into pressing engagement with the ends of the article 111 and provides for maintaining the plurality of tablets or wafers in proper cylindrical form during subsequent transfer and folding operations.

The tucking fingers 225 are carried by arms 226 which are rigidly connected to an arm member 227 loosely mounted upon a shaft 228. A link 229 is pivotally connected to the arm 227 as indicated at 230, Figs. 3 and 18, and is pivotally connected at its lower end to an arm 231 which is attached to a shaft 232. An arm 233 is attached to the shaft 232 and is provided with a roller 234 which is received within a groove on one face of a cam 235 mounted upon the drive shaft 80. The tucking arm 224 is thus moved upwardly and downwardly in accordance with movement of the continuously rotating drive shaft 80.

*First discharge and transfer apparatus*

When the wrapping wheel 54 dwells at a position diametrically opposite the feeding station, a discharge mechanism 240 comes into operation to move the partially wrapped article from the wrapping wheel 54 to the banding wheel 56. This discharge mechanism comprises a pusher member, indicated generally by the reference character 240, which is carried by an angle member 241. The angle member 241 is driven in timed relationship to the other parts of the machine by any suitable means, not shown, adapted to move the pusher 240 longitudinally of the machine and through a suitable transfer channel 243 towards the banding wheel 56. The pusher 240 moves through openings provided at the inner sides of the article receiving pockets by the projections or lugs 62.

The transfer channel 243 comprises an outwardly extending portion on the saddle block 201, a portion 244 carried by a bracket attached to the machine frame and an upper portion 245 also carried by the machine frame. The pusher mechanism 240 advances the partially wrapped article entirely through the transfer channel 243 into the pocket 72 provided in the banding wheel 56.

Prior to this operation, however, a banding member 250 which may be in the form of a label is advanced by suitable feed mechanism, illustrated generally by the feed wheels 251, into a position to be partially wrapped about the article upon movement into the pocket 72. The upper transfer member 245 supports a guide member 252 which in cooperation with a guide member 253 provides for guiding the band 250 into operative position with respect to the banding wheel 56 and the article advanced thereinto.

After the partially wrapped article has reached the first discharge position of Fig. 18, and prior to operation of pusher 240, a second longitudinally movable rod 260, Figs. 2, 4 and 18, provided with an inclined cam surface 261 similar to the surface 142 of rod 140, operates upon the pin 143 of the wrapper clamping finger 66 to release said finger from engagement with the article and wrapper. The rod 260 extends transversely of the machine as illustrated in Fig. 3 and is operated by an arm 262 attached to the rock shaft 145 which operates the arm 141 and rod 140. The article clamping finger 73 of banding wheel 56, however, is adapted to be moved outwardly against its spring tensioning means only by the insertion of the article therein by pusher 240 and, accordingly, serves to iron the outer band around the partially wrapped article.

Band clamping mechanism

The lower end of the outer band 250 as fed by the feed mechanism 251 is received upon the upper surface of a pair of plate members 265, Figs. 1, 16, 18 and 19, which are bolted to a pair of band clamping arms 266. The upper ends of the plates 265 extend outwardly from the inner sides of the arms 266, as illustrated, and are received within slots 267 provided in the pocket forming lugs 71 of the banding wheel. The band clamping arms 266 operate in a manner generally similar to the wrapper clamping arms 126 and are provided with surfaces 268 which clamp the lower end of the band 250 against the outer circumference of the banding wheel 56 during insertion of the article through the wrapper by the pusher 240. The upper ends of the clamping arms 266 are also provided with inclined surfaces 269 which serve as a guide for the lower end of the band during feeding thereof.

The band clamping arms 266 are provided with hub portions 275 which are freely mounted upon the shaft 228. A resilient drive for the arms 266, indicated generally by the reference numeral 276, and which corresponds to the drive for the clamping arms 126, is provided between the shaft 228 and the band clamping arms 266. This resilient drive includes a member 277 which is rigidly attached to the shaft 228 and a linkage 278 which is connected to an arm 279 attached to the shaft 228. The link member 278 is pivotally connected to the arm 279 and to the arm 135. Operation of the arm 135 by the above described cam mechanism thus effects a corresponding operation of link 278 and of the shaft 228. The clamping arm 266 is thus operated in timed relationship with respect to the clamping arm 126.

The operation of the parts is such that the band clamping arms 266 start their movement towards the banding wheel at the proper point in the operating cycle to have the lower end of the band 250 received upon the plates 265 just prior to the clamping of the lower end of the band by the clamping portions 268. Following the insertion of the article with the outer band partially wrapped therearound, the band clamping arms 266 are released to an inoperative position as illustrated in Fig. 19, and the banding wheel 56 then starts to rotate in the direction of the arrow shown in Fig. 18. The lower end 286 of the band is thus released from the clamping arms 266 and the band assumes the position illustrated at station 286, in Figs. 1 and 18.

Band folding and gluing operation

The banding wheel 56 upon its subsequent rotation carries the partially wrapped article to the lowermost station illustrated in Fig. 1 where a band folding and gluing mechanism comes into operation. During dwell of the banding wheel together with the partially banded article at this station the left hand portion of the outer band is first folded against the side of the circumferentially wrapped article.

This operation is accomplished by means of a folder plate 290 which is carried by an angle member 291, Figs. 21 and 21a, which is bolted to an arm 292. The folder 290 is resiliently mounted upon the angle member 291 by means of pins 293, Fig. 21a, which extend through suitable openings in the upper leg of member 291 and have springs 294 compressed between the said upper leg and washers 295. The arm 292 is attached to a shaft 300, Fig. 2, and an arm 301 is also attached to the shaft 300 and carries a roller 302. The roller 302 operates in a cam groove provided in one face of a cam member 304 attached to the shaft 81. Thus as the shaft 81 and cam 304 rotate, the left hand folder 290 is caused to move towards the right from a retracted position to a position illustrated in Fig. 21 to effect folding of the left hand portion of the band around the circumference of the article.

The folder plate 290 has a bearing block 310, Figs. 21, 21a, 22 and 23, rigidly attached thereto which carries a pair of slidably mounted plungers or rods 311. Each of the rods 311 carries a stripper block 312 which operates in a manner generally similar to the stripper arms 175 of the wrapping wheel 54. To this end a coil spring 313 is mounted around the rods 311 and provides for normally moving the stripper block 312 with the left hand band folder 290. Upon engagement of the stripper 312 with the article, however, the band folder 290 is free to continue movement to fold the outer band around the partially wrapped article as illustrated in Fig. 21.

Substantially simultaneously with the movement of the left band folder 290 to fold the left hand side of the band around the partially wrapped article, a glue wheel 315, Fig. 21, is moved upwardly to engage the under side 316 of the band 285. After the gluing operation has been completed, the glue wheel 315 is retracted as illustrated in Fig. 22, and a right hand folding arm 317 begins to move towards the left, Fig. 22, to fold the glued end 316 of the wrapper against the left hand folded portion thereof. After a predetermined movement of the right hand folder 317, the banding wheel 56 begins to rotate again under action of the Geneva mechanism and the folder 317 in cooperation with the left hand folder 290 causes the glued right hand end of the outer band to overlap the folded left hand end of the band as illustrated in Fig. 23.

During movement of the banding wheel 56 together with the article 111 therein between the positions illustrated in Figs. 22 and 23, the stripper block 312 follows movement of the article under action of spring 313, as illustrated in Fig. 23, to effect stripping of the outer band with respect to the left hand folder 290. Collars 318 provided on the rods 311 limit movement of the rods 311 under action of springs 313 and provide for retracting the stripper block 312 upon retracting movement of the arm 292 carrying the folding member 290. The clamping fingers 73 are provided with recesses or slots 319 which receive the stripper block 312 and the stripper block is provided with a suitable arcuate end 320 which engages around the article and extends externally of the clamping fingers 73. The package has the appearance which is shown in Fig. 24 after the operation of Fig. 23.

Gluing apparatus

The glue roll 315 is rotatably mounted in a glue pot 325, Fig. 1, which is carried by a frame 326. The frame 326 has an extension 327 which is clamped around a shaft 328 by means of clamping members 329. The shaft 328 is rotatably mounted in suitable bearings provided in the main frame 50 and a bracket 330 attached thereto, Figs. 1 and 2, and is provided with an arm 331 carrying a roller 332. The roller 332 operates in a cam groove provided in one face of a cam 333 mounted on the drive shaft 81. Thus, as the shaft 81 rotates, the glue box 325 together with the glue roller 315 is caused to raise and lower to contact the glue roller with the outer band portion 316 as shown in Fig. 21 and to retract the roller from the band as illustrated in Figs. 22 and 23.

The glue roller 315 is rotated in the direction of the arrow shown in Fig. 1 by means of a gear train partially shown in Fig. 2 and diagrammatically shown in Figs. 1 and 4. Referring to Fig. 4, a pinion 340 is attached to the drive shaft 81 and meshes with an idler gear 341 mounted on a shaft 342. The idler 341 meshes with a gear 343 mounted on a shaft 344 carried by the glue box frame 326. The gear 343 meshes with a gear 345 mounted on a shaft 346 which carries the glue roller 315.

A doctor blade 350 is bolted to a shaft 351 which is carried by the glue pot 325, and is normally urged out of engagement with the peripheral and side portions of the glue roll 315 by suitable spring means (not shown). A downwardly extending lever 352 is clamped to the shaft 351 and is provided with an adjustable set screw 353. A curved lever 354 is pivotally mounted upon the glue pot frame 326, as indicated at 355, and carries a plate 356 adapted to engage against the set screw 353. The lever 354 carries a roller 357 which rides upon a cam 358 mounted upon the shaft 344 of the gear 343. Thus, as the cam 358 is rotated by the gear shaft 344, the doctor blade 350 is moved towards and away from the glue roll, and the timing of the parts is such that the doctor blade scrapes glue away from the glue roll 315 just prior to the retraction of the glue roll, upon downward movement of the frame 326, to prevent stringing of the glue from the glued end of the band portions 285.

Right hand band folding mechanism

The right hand band folder 317 is operated by means of one arm 365, Figs. 1, 25, 27 and 28, of a bell crank lever 366 mounted on the shaft 55 of the banding wheel 56. The arm 365 extends in a generally downward direction and is provided with an angular portion 367 which carries the folder 317. The folder 317 is pivotally mounted on a stud shaft 368 carried by a bearing lug 369 provided on the arm portion 367. The folder 317 is provided with a rearwardly extending arm or leg 370 having an opening through which a bolt 371 freely extends. The bolt 371 is threadedly mounted within a rearwardly extending lug 372 which is carried by the lower portion 367 of the arm 365 and overlies the leg 370 of the folder. A compression spring 373 is mounted on the bolt 371 between the leg 370 of the folder and the lug 372 of the supporting arm and serves resiliently to hold the leg 370 against the head of the bolt. The bolt 371 thus provides for positioning the left hand end of the folder 317 and this position can be adjusted by adjusting the bolt. Upon engagement of an article with the folder, however, the folder is free to turn about its pivot 368 by compressing the spring 373.

Operation of the bell crank 366 to cause operation of the right hand band folder 317 is effected by means of an arm 375 which extends upwardly from the bell crank and is pivotally connected to a link 376, Figs. 1 and 2. The link 376 is pivotally connected at its opposite end to an upwardly extending arm 377 carried by and attached to the transversely extending shaft 154. The shaft 154 is adapted to be rocked to operate the folder 317 by means of a downwardly extending arm 378 which is attached to the shaft and is provided with a roller 379 at its lower end. The roller 379 operates within a suitable cam groove provided in one face of a cam 380 carried by the drive shaft 81.

Band sealing apparatus

The adhesively secured overlapping ends of the outer band are maintained in proper folded condition during movement of the article from the band folding and gluing position to a discharge position by means of a saddle member 385, Figs. 1, 25, 27 and 28, which extends adjacent the periphery of the banding wheel between these stations. The lower end of the saddle 385 comprises a plurality of fingers 386 which project downwardly to a position closely adjacent the right hand band folder 317 when the band folder is in its retracted position illustrated in Fig. 1. The entire saddle is resiliently carried by a pair of frame members 387 which extend angularly downward adjacent the rear side of the saddle and are carried by a suitable portion of the machine frame structure.

The saddle 385 is supported on the frame 387 by means of four pins 388 which are attached to suitable lugs at the four corners of the saddle and extend through openings provided in the frame member. A compression spring 389 is mounted on each of the pins 388 between the saddle and supporting frame and serve to mount resiliently the saddle and urge it into pressing engagement with articles carried by the band wheel. Outward movement of the saddle under action of the springs 389 is limited by suitable washers and cotter pins provided on the pins 388 at the lower side of the frame member 387.

The saddle is cut away, as indicated at 390 in Fig. 28, to provide an opening within which the right hand band folding mechanism operates. The saddle also carries a cartridge type electric heating element 391 which assists in drying the adhesives securing the overlapping portions of the band together during movement of the article along the saddle. Upon completion of the band folding and gluing operation and during movement of the article along the saddle 385 the package has the form illustrated in Fig. 26.

Second discharge and transfer apparatus

The next operation is the discharge of the banded article from the banding wheel, which is accomplished during dwell of the banding wheel at the station 400, Figs. 1, 25 and 27. At this station the position of the article in the banding wheel is such that the tucked portions 226 of the inner wrapper are positioned adjacent the bottom or inner side of the pocket 72 of the banding wheel and the outwardly extending untucked portions 401 of the inner wrapper, Fig. 26, are positioned at the outer or open side of the pocket. A trigger finger 402, Figs. 1, 25, 27 and 28, is also in engagement with a central portion of the article at the outer side thereof.

The finger 402 is attached to a shaft 403 which is pivotally mounted in a bearing 404 carried by the saddle member 385. A bell crank having an upwardly extending arm 405 and a downwardly extending arm 406 is attached to the shaft 403, and a spring 407 connected between the arm 406 and a fixed pin 408 provides for resiliently urging the trigger finger 402 into pressing engagement with an article at the discharge station 400. The pin 408 is mounted on one of a pair of bracket arms 409 which are carried by the machine frame and also provide for supporting one end of a conveyor belt mechanism. A fixed pin 410 is carried by the frame member 387 and provides a stop for limiting movement of the trigger finger under action of spring 407.

The article is discharged from the banding wheel by means of a pair of ejector bars or arms 415, Figs. 1, 2, 25, 27, 28 and 29, which are bolted to a block 416 attached to a shaft 417. The shaft 417 is rotatably supported by a suitable bushing 418 which extends outwardly from the machine frame adjacent the discharge station 400. Upon rocking of the shaft 417 the lower ends 419 of the ejector bars 415 are adapted to engage the partially wrapped package adjacent the ends of the article contained therein and move the article from the banding wheel to a conveyor apparatus. Each of the ejector bars is also provided adjacent its lower end with a forwardly extending finger 420 which is bolted to the bar and is adapted to enter within the tucks 226 of the inner wrapper during the discharge and transfer operation.

The trigger finger 402, which is in engagement with the central portion of the article, serves to prevent the article from tilting during an initial portion of the discharge operation. During this portion of discharge the article is clamped under action of spring 407 between the lower ends 419 of the ejector bars and the finger 402. As soon as the ejectors reach a predetermined position in their path of discharge movement, however, an angle member 421, which is bolted to one of the ejector bars 415, engages the upwardly extending arm 405 attached to the shaft 403 of the trigger finger, as illustrated in Fig. 27. Continued movement of the ejector arms thus causes the finger to be moved to a lower, out of the way position, with respect to the article.

The ejector bars or arms 415 are operated by means of an arm 425, Figs. 1 and 2, which is attached to the shaft 417 of the ejector mechanism and is pivotally connected at its lower end to a link 426. The opposite end of the link 426 is attached to a strap 427 which engages around an eccentric 428 attached to the transversely extending shaft 87, Fig. 3. Thus, as the shaft 87 rotates, the eccentric 428 rocks the arm 425 which causes rocking movement of the ejector arms.

A means is also provided for releasing the article gripping fingers 73 of the banding wheel just prior to the ejection of the article from the banding wheel at the discharge station 400. This means comprises a slidably mounted rod 430 which has the same construction and manner of operation as the rods 140 and 260 and extends transversely of the machine adjacent the banding wheel discharge station in a position to engage an upwardly projecting operating pin 431 carried by the clamp 73. An arm 432 attached to the rock shaft 145, Figs. 2 and 4, and corresponding to the arms 141 and 262, provides for operating the rod 430.

Conveying and end folding apparatus

The articles are discharged upon a table 435, Figs. 25 and 29, forming an extension of the saddle 385, and are then moved by the ejector mechanism onto an endless conveyor belt 436. After the article has been transferred to the conveyor belt the ejector arms 415 are withdrawn to the retracted position shown in Fig. 1 by the mechanism above described. The conveyor belt 436 passes around a drum 437 which is attached to a shaft 438 carried by the bracket arms 409. At its opposite end the conveyor passes around a drum 439 rotatably mounted in a suitable frame structure carried by the machine. A frame plate 440, forming an extension of the frame member 387, extends along substantially the entire length of the conveyor and provides a support for the upper reach of the conveyor belt 436.

The discharged articles are first received beneath an upper plate 445 which is resiliently mounted upon an overhanging plate 446 by means of studs 447 and springs 448. The plate 446 is bolted to an upstanding bracket on a portion of the conveyor frame, and the springs 448 provide for pressing the plate 445 into engagement with the upper portion of an article supported upon the conveyor belt 436. The article is thus caused to rotate about its longitudinal axis, as indicated by the arrows in Figs. 25 and 29, as it moves along with the conveyor belt.

This rotation of the article about its longitudinal axis is continued as the article is moved along the conveyor by the belt 436 by means of a longitudinally extending top plate 450 to which a strip of rubber or like material 451, having engagement with the top of the articles, is attached. The plate 450 carrying the rubber strip extends along substantially the entire length of the conveyor and is rigidly supported by means of suitable brackets, indicated generally by the reference character 452, which are carried by a portion of the conveyor frame structure.

The outwardly extending portions 401 of the inner wrapper 115 are folded down against the tucked wrapper portions 226 and the ends of the article during movement of the article along the length of the conveyor 436. This completion of the folding of the wrapper about the article is accomplished by means of longitudinally extending cam plates 455 which are carried by the upper plate member 450, Figs. 29 and 30, and extend along a portion of the length of the conveyor. The cam plates 455 are resiliently mounted upon the longitudinal plate 450 by means of bolts 456 and springs 457.

The lower side 458 of the cam plates 455 engages against the outwardly extending portions 401 of the wrapper and gradually folds these portions down against the ends of the article as the rotating article is moved along the length of the cam plates. For this purpose the lower side 458 of the cam plates provides a surface of gradually increasing taper or inclination, as indicated in Figs. 32a to 32d both inclusive, which, starts with a substantially horizontal surface, as indicated in Fig. 32a and which ends in a substantially vertical surface, as indicated by the dashed line 459 in Fig. 32d. The cam surface 458, accordingly, has a configuration corresponding generally to 90° of a spiral. Thus, as the article which is being continuously rotated, as above described, moves along the conveyor, the cam surfaces 458 gradually fold the outwardly extending portions 401 of the wrapper against the inwardly tucked portions thereof and also the ends of the article, as indicated at 460 in Fig. 33.

After the wrapper has been completely folded down against the end portions of the article contained therein, the wrapped article continues to move along the conveyor while rotating thereon, and a pair of side plate members 465, Figs. 29 and 31, press the folded ends of the wrapper into engagement with the article. The side plates 465 are carried by angle members 466 bolted to the longitudinal top plate 450 and are resiliently pressed against the ends of the wrapped article by means of compression springs 467 mounted on pins 468. The article thus wrapped and ironed is then fed by the conveyor onto any desired receiving table or the like, indicated generally by the reference character 469, Fig. 29.

The conveyor belt 436 is operated by means of a gear train driven by the idler gear 341 mounted on the shaft 342, Figs. 1, 2 and 4. As shown in Figs. 2 and 4, the idler 341 carries a pinion 475 which meshes with an idler gear 476 carried by a shaft 477. The idler 476 carries a pinion 478 which meshes with a gear 479 attached to the shaft 438 of the conveyor drum 437. Thus as the idler 341 is rotated by the drive shaft 81, the conveyor drum 437 is caused to rotate to drive the conveyor belt 436.

Operation

The wrapper 115, preferably having a tearing tab 116, is first advanced by the feed rolls 117 and rests upon the angle bars 118. The lower end of the wrapper then is gripped by the wrapper clamping fingers 125. The article 111 is then advanced by the pusher 110 through the wrapper and into one of the pockets of the wrapping wheel 54. At this time the clamping finger 73 for the article is in raised or inoperative position. Substantially immediately after the article 111 is inserted within the pocket of the wrapping wheel, the article clamping finger 73 is permitted to move downwardly under action of its operating spring and the upper side folder 170 begins downward movement to fold the upper end 160 of the wrapper against the side of the article. Thereafter the wrapping wheel starts to rotate and the lower folder 129 provides for wrapping the lower portion 196 of the wrapper over the upper portion 160 thereof. The strippers 175 also operate with the upper side folder 170 for the wrapper in the manner described.

The pressure plates 210 provide for maintaining the overlapping portions of the wrapper against the article during subsequent movement of the article in the wrapping wheel. The heating element 221 operating upon the wax spots 222 provides for partially sealing the overlapped portions of the wrapper together. Continued movement of the article to the discharge position of the wrapping wheel causes the thus sealed portions of the wrapper to be pressed together.

The wrapper has a width substantially greater than the length of the article to provide outwardly extending ends which are adapted to be folded against the ends of the article. At the lowermost station of the wrapping wheel, a pair of fingers 225 move upwardly to provide a tuck in the outwardly extending portions of the wrapper. This tuck engages the ends of the article and provides for maintaining the tablet or wafers in substantially cylindrical form during subsequent transfer and wrapping operations.

A discharge mechanism 240 then comes into operation to transfer the partially wrapped articles from the wrapping wheel 54 to the banding wheel 56. Prior to the transfer of the partially wrapped article to the banding wheel 56, an outer band or label 250 is fed downwardly by feed means 251. This band or label is applied around the circumference of the partially wrapped article during transit on the banding wheel 56.

The partially wrapped article with the band thus applied, is moved to a discharge station by the banding wheel. At this station the ejector arms 415 in cooperation with the trigger finger 402 provide for ejecting the article from the banding wheel and moving it to the conveyor belt 436. Forwardly extending fingers 420 provided on the ejector arms 415 are adapted to enter the tucked portions 220 of the article during ejection of the article. Means engaging the upper portion of the article provide for effecting rotation of the article about its longitudinal axis during movement on the conveyor belt 436.

As the rotating article moves along the conveyor, the cam plates 445 provide for folding the remaining outstanding ends of the wrapper against the ends of the article, the lower side portions 458 of the cam plates being provided with a generally spiral surface for effecting this operation. Thereafter, the side plate members 465 provide for ironing the folded ends of the wrapper against the ends of the article. The conveyor 436 then discharges the completely wrapped article upon any desired receiving table or mechanism.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. The method of wrapping a plurality of tablets, wafers and the like arranged in substantially cylindrical article form which comprises applying a wrapper longitudinally about the article with the ends of the wrapper extending outwardly beyond the ends of the article, forming a tuck in each outwardly extending end of the wrapper to engage the ends of the article, linearly transferring the partially wrapped article to a label applying zone while maintaining the tablets in said substantially cylindrical form solely by said tucks, applying a label and thereafter folding down the remaining portions of said outwardly extending ends of said wrapper.

2. A machine for wrapping articles comprising a wrapping wheel, means for feeding a wrapper into predetermined position with respect to said wheel, means for feeding an article through the wrapper into said wrapping wheel, means cooperating with the wrapping wheel for folding said wrapper longitudinally about said article while on said wrapping wheel, a conveyor, means for transferring the partially wrapped article to said conveyor, means for effecting rotation of the article while moving on said conveyor, and means operative upon the rotating article for folding end portions of the wrapper against the article during travel of the article along the conveyor.

3. A machine for wrapping articles comprising a wrapping wheel, means for feeding a wrapper into predetermined position with respect to said wheel, means for feeding an article through the wrapper into said wrapping wheel, means cooperating with the wrapping wheel for folding said wrapper longitudinally about said article while on said wrapping wheel, a banding wheel, means for transferring the article to said banding wheel, means cooperating with the banding wheel for applying an outer band around said article while on said banding wheel, a conveyor, means for transferring the partially wrapped and banded article to said conveyor, means for effecting rotation of the article while moving on said conveyor, and means operative upon the rotating article for folding end portions of the wrapper against the article during travel of the article upon the conveyor.

4. A machine fro wrapping articles comprising a wrapping wheel, means for feeding a wrapper into predetermined position with respect to said wheel, means for feeding an article through the wrapper into said wrapping wheel, means for clamping said article against rotation while on said wrapping wheel, means cooperating with the wrapping wheel for folding said wrapper longitudinally about said article on said wrapping wheel, a banding wheel, means for transferring the partially wrapped article to said banding wheel, means cooperating with the banding wheel for applying a band around said article while clamping the article against rotation upon said banding wheel, means for ejecting the article from said banding wheel, a discharge conveyor for receiving the ejected article, means for effecting rotation of said article while moving upon said discharge conveyor, and an elongated folder having a continuous folding surface arranged adjacent each side of the conveyor and operative upon the rotating article for folding end portions of said wrapper against ends of said article during travel of the article upon said conveyor.

5. A machine for wrapping articles comprising wrapping mechanism including a rotary wheel having an article receiving pocket, a plurality of arms arranged at an ejecting station and adapted to engage an article in said pocket adjacent the opposite ends of the pocket for ejecting the article from said wheel, a spring pressed finger positioned for engaging a forward portion of the article intermediate said arms during ejection at the ejecting station, and means operated by said ejecting arms for moving said finger to an inoperative position after predetermined ejecting movement of the arms.

6. A machine for wrapping articles comprising means for applying a wrapper longitudinally about an article with the ends of the wrapper extending outwardly beyond the ends of the article, means for forming a tuck in each outwardly extending end of the wrapper, rotating means for transferring the tucked article to a predetermined position, means for ejecting the article from said rotating means at said predetermined position, and fingers carried by said ejecting means for entering said tucks and maintaining the same closed during ejection of the article at said position.

7. A machine for wrapping a plurality of tablets, wafers and the like arranged to provide an article of substantially cylindrical form which comprises a wrapping wheel, means for feeding a wrapper into predetermined position with respect to said wheel, means for feeding the article through the wrapper into said wrapping wheel, means cooperating with the wrapping wheel for folding said wrapper longitudinally about the article while on said wrapping wheel with the ends of the wrapper extending outwardly beyond the ends of the article, means for forming a tuck in each said outwardly extending end of the wrapper while the article is on said wrapping wheel, a banding wheel, means for transferring the partially wrapped article to said banding wheel with the tablets maintained in said substantially cylindrical form by said tucks, means cooperating with the banding wheel for applying an outer band around the article while on said banding wheel, a discharge conveyor means for transferring the article from the banding wheel to said discharge conveyor, means for effecting rotation of the article while moving on said conveyor, and an elongated folder having a continuous folding surface arranged adjacent each side of the conveyor and operative upon the rotating article for folding the remaining portions of said outwardly extending ends of the wrapper against the ends of the article during travel of the article upon the conveyor.

8. A machine for wrapping a plurality of tablets, wafers and the like arranged to provide an article of substantially cylindrical form which comprises a wrapping wheel, means for feeding a wrapper into predetermined position with respect to said wheel, means for feeding the article through the wrapper into said wrapping wheel, means cooperating with the wrapping wheel for folding said wrapper longitudinally about the article while on said wrapping wheel with the ends of the wrapper extending outwardly beyond the ends of the article, means for forming a tuck in each outwardly extending end of the wrapper while the article is on said wrapping wheel, a banding wheel, means for transferring the partially wrapped article to said banding wheel with the tablets maintained in said substantially cylindrical form by said tucks, said tucks being arranged in predetermined position on said banding wheel, means for clamping the article against rotation while on the banding wheel, means cooperating with the banding wheel for applying an outer band around the article while on said banding wheel, means for ejecting the article from said banding wheel, fingers carried by said ejecting means for entering said tucks during ejection of the article, a spring pressed finger for engaging a forward central portion of the article during predetermined movement of the ejecting means, a conveyor for receiving the ejected article, means for effecting rotation of the article while moving on said conveyor, and an elongated folder having a continuous folding surface arranged adjacent each side of the conveyor and operative upon the rotating article for folding the remaining portions of said outwardly extending ends of the wrapper against the ends of the article during travel of the article upon the conveyor.

9. A machine for wrapping a plurality of tablets, wafers, and the like arranged to provide an article of substantially cylindrical form which comprises means for applying a wrapper longitudinally about the article with the ends of the wrapper extending outwardly beyond the ends of the article, means for forming a tuck in each outwardly extending end of the wrapper, means for bodily transferring the partially wrapped and tucked article from one position to another with the tablets maintained in said substantially cylindrical form by said tucks, means for applying an outer band around the article after transfer to said last named position, and means for thereafter folding the remaining portions of said outwardly extending ends of the wrapper against the ends of the article.

10. A machine of the character described comprising a wheel-like member mounted for rotation about a fixed axis, a pocket on said wheel-like member for receiving a substantially cylindrical article, means for intermittently driving said wheel-like member, means for feeding sheet material into predetermined position with respect to said wheel-like member, means for feeding an article through said sheet material into said pocket with ends of the sheet material extending outwardly beyond side edges of the pocket, and means for folding said outwardly extending ends of the sheet material around the article comprising a folding member and a stripper arranged adjacent a dwell position of said pocket, means for moving said folding member to wrap one of said outwardly extending ends of the sheet member around the article during dwell of the pocket at said position, means for moving said stripper into engagement with the partially wrapped article, means for initiating rotational movement of the wheel-like member and for simultaneously effecting further movement of said folding member and said stripper in the direction of movement of the wheel-like member, and means for retracting said folding member while maintaining said stripper in engagement with said article and the sheet material wrapped there-around.

11. A machine of the character described comprising a wheel-like member mounted for rotation about a fixed axis, a pocket on said wheel-like member for receiving a substantially cylindrical article, means for intermittently driving said wheel-like member, means for feeding sheet material into predetermined position with respect to said wheel-like member, means for feeding an article through said sheet material into said pocket with ends of the sheet material extending outwardly beyond side edges of the pocket, and means for folding said outwardly extending ends of the sheet material around the article comprising a folding member and a stripper arranged adjacent a dwell position of said pocket, means for moving said folding member to wrap one of said outwardly extending ends of the sheet member around the article during dwell of the pocket at said position, resilient means between said folding member and said stripper for moving the stripper into engagement with the partially wrapped article upon folding movement of the folding member, and means for retracting said folding member while maintaining said stripper in engagement with said article and the sheet material wrapped there-around under action of said resilient means.

12. A machine of the character described comprising a wheel-like member mounted for rotation about a fixed axis, a pocket on said wheel-like member for receiving a substantially cylindrical article, means for intermittently driving said wheel-like member, means for feeding sheet material into predetermined position with respect to said wheel-like member, means for feeding an article through said sheet material into said pocket with ends of the sheet material extending outwardly beyond side edges of the pocket, and means for folding said outwardly extending ends of the sheet material around the article comprising a folding member and a stripper arranged adjacent a dwell position of said pocket, means for moving said folding member to wrap one of said outwardly extending ends of the sheet material around the article during dwell of the pocket at said position, resilient means between said folding member and said stripper for moving the stripper into engagement with the partially wrapped article upon folding movement of the folding member, means for initiating rotational movement of the wheel-like member and for simultaneously effecting further movement of said folding member and said stripper in the direction of movement of the wheel-like member, and means for retracting said folding member while maintaining said stripper in engagement with said article and the sheet material wrapped therearound under action of said resilient means.

13. A machine of the character described comprising a wheel-like member mounted for rotation about a fixed axis, a pocket on said wheel-like member for receiving a substantially cylindrical article, means for intermittently driving said wheel-like member, means for feeding sheet material into predetermined position with respect to said wheel-like member, means for feeding an article through said sheet material into said pocket with ends of the sheet material extending outwardly beyond side edges of the pocket, and means for folding said outwardly extending ends of the sheet material around the article comprising a folding member and a stripper arranged adjacent a dwell position of said pocket, a carrier for said folding member, spring means for resiliently mounting the folding member on said carrier, means for moving said carrier and folding member to wrap one of said outwardly extending ends of the sheet material around the article during dwell of the pocket at said position, resilient means between said folding member and said stripper for moving the stripper into engagement with the partially wrapped article upon folding movement of the folding member, and means for retracting said folding member while maintaining said stripper in engagement with said article and the sheet material wrapped therearound under action of said resilient means.

14. A machine of the character described comprising a wheel-like member mounted for rotation about a fixed axis, a pocket on said wheel-like member for receiving a substantially cylindrical article, means for intermittently driving said wheel-like member, means for feeding sheet material into predetermined position with respect to said wheel-like member, means for feeding an article through said sheet material into said pocket with ends of the sheet material extending outwardly beyond side edges of the pocket, and means for folding said outwardly extending ends of the sheet material around the article comprising a folding member and a stripper arranged adjacent a dwell position of said pocket, means for moving said folding member to wrap one of said outwardly extending ends of the sheet material around the article during dwell of the pocket at said position, resilient means between said folding member and said stripper for moving the stripper into engagement with the partially wrapped article upon folding movement of the folding member, means for retracting said folding member while maintaining said stripper in engagement with said article and the sheet material wrapped there-around under action of said resilient means, and a second folder operative to lap a portion of the other outwardly extending end of the sheet material over said first named end prior to retraction of said first named folding member.

15. A machine of the character described comprising a frame, a wheel-like member mounted on said frame for rotation about a fixed axis, a pocket on said wheel-like member for receiving a substantially cylindrical article, means for intermittently driving said wheel-like member, means for feeding sheet material into predetermined position with respect to said wheel-like member, means on said frame for clamping one end of said sheet material, means for feeding an article through said sheet material into said pocket with ends of the sheet material extending outwardly beyond side edges of the pocket, and means for folding said outwardly extending ends of the sheet material around the article comprising a folding member and a stripper arranged adjacent a dwell position of said pocket, means for moving said folding member to wrap one of said outwardly extending ends of the sheet material around the article during dwell of the pocket at said position, means for moving said stripper into engagement with the partially wrapped article, means for initiating rotational movement of the wheel-like member and for simultaneously effecting further movement of said folding member and said stripper in the direction of movement of the wheel-like member, and means for retracting said folding member while maintaining said stripper in engagement with said article and the sheet material wrapped there-around, and means for releasing said clamping means just prior to movement of the wheel-like member.

16. A machine of the character described comprising a frame, a wheel-like member mounted on said frame for rotation about a fixed axis, a pocket on said wheel-like member for receiving a substantially cylindrical article, means for intermittently driving said wheel-like member, means for feeding sheet material into predetermined position with respect to a dwell position of said pocket, means on said frame for clamping one end of said sheet material against a folding member, means for feeding an article through said sheet material into said pocket with ends of the sheet material extending outwardly beyond side edges of the pocket, and means for folding said outwardly extending ends of the sheet material around the article comprising a second folding member and a stripper arranged adjacent said dwell position of said pocket, means for moving said folding member to wrap one of said outwardly extending ends of the sheet material around the article during dwell of the pocket at said position, means for moving said stripper into engagement with the partially wrapped article, means for initiating rotational movement of the wheel-like member and for simultaneously effecting further movement of said folding member and said stripper in the direction of movement of the wheel-like member, means for retracting said folding member while maintaining said stripper in engagement with said article and the sheet material wrapped there-around, and means for releasing said clamping means just prior to movement of the wheel-like member, said first named folding member providing for lapping the other of said outwardly extending ends of the sheet material over the first named end during movement of said wheel-like member and retraction of said second folding member.

17. A machine of the character described comprising a frame, a wheel-like member mounted on said frame for rotation about a fixed axis, a pocket on said wheel-like member for receiving a substantially cylindrical article, means for intermittently driving said wheel-like member, means for feeding sheet material into predetermined position with respect to a dwell position of said pocket, means on said frame for clamping one end of said sheet material against a folding member, means for feeding an article through said sheet material into said pocket with ends of the sheet material extending outwardly beyond side edges of the pocket, means on said wheel-like member for clamping said article in said pocket, and means for folding said outwardly extending ends of the sheet material around the article comprising a second folding member and a stripper arranged adjacent said dwell position of said pocket, means for moving said folding member to wrap one of said outwardly extending ends of the sheet material around the article during dwell of the pocket at said position, means for moving said stripper into engagement with the partially wrapped article, means for initiating rotational movement of the wheel-like member and for simultaneously effecting further movement of said folding member and said stripper in the direction of movement of the wheel-like member, means for retracting said folding member while maintaining said stripper in engagement with said article and the sheet material wrapped there-around, and means for releasing said clamping means just prior to movement of the wheel-like member, said first named folding member providing for lapping the other of said outwardly extending ends of the sheet material over the first named end during movement of said wheel-like member and retraction of said second folding member.

18. A machine of the character described comprising a wheel-like member mounted for rotation about a fixed axis, a pocket on said wheel-like member for receiving a substantially cylindrical article, means for intermittently driving said wheel-like member, means for feeding sheet material into predetermined position with respect to said wheel-like member, means for feeding an article through said sheet material into said pocket with ends of the sheet material extending outwardly beyond side edges of the pocket, and means for folding said outwardly extending ends of the sheet material around the article comprising a folding member and a stripper arranged adjacent a dwell position of said pocket, means for moving said folding member to wrap one of said outwardly extending ends of the sheet material around the article during dwell of the pocket at said position, resilient means between said folding member and said stripper for moving the stripper into engagement with the partially wrapped article upon folding movement of the folding member, means for gluing the other outwardly extending end of said sheet material, means for retracting said folding member while maintaining said stripper in engagement with said article and the sheet material wrapped there-around under action of said resilient means, and means for wrapping said glued end of the sheet material around the article.

19. In a machine of the character described, a wheel-like member mounted for rotation about a fixed axis, a pocket on said wheel-like member for receiving an article, spring pressed means on said wheel-like member for clamping an article in said pocket, and means for moving said clamping means to an unclamped position comprising a cam, an operating member for said cam extending substantially parallel with said axis of the wheel-like member, and means for axially moving said operating member.

20. A machine for wrapping a plurality of tablets, wafers and the like arranged in stacked relationship to form a cylindrical article comprising means for applying a wrapper about the sides of said article with the wrapper ends extending beyond the ends of the article, a pair of folding fingers, and carrier means for transporting the article and wrapper between said fingers whereby to fold a portion of said wrapper ends, as tucks, down upon the ends of said article whereby to hold the tablets in stacked relationship within the partially folded wrapper in condition for a further wrapping operation, said fingers being movable to retract the same from wrapper folding position after having formed said tucks.

21. A machine for wrapping articles partially enclosed within a tubular wrapper having end portions extending beyond an end of the article being wrapped comprising means for rotating the article and its wrapper about the longitudinal axis of the article and for moving the article along an end folding path in a direction transversely of said axis, and progressively inclined end folding means for folding said projecting wrapper end portions progressively and continuously down upon the end of the article being wrapped, said end folding means comprising a folder bar disposed adjacent the path of said article in position to engage the projecting end portions of the wrapper, said bar having a surface uniformly and progressively inclined toward the end of said article as it travels along said end folding path.

CLARENCE J. MALHIOT.